United States Patent
Kim et al.

(10) Patent No.: US 10,248,155 B2
(45) Date of Patent: Apr. 2, 2019

(54) SEMICONDUCTOR DEVICE INCLUDING CLOCK GENERATING CIRCUIT AND CHANNEL MANAGEMENT CIRCUIT

(71) Applicant: SAMSUNG ELECTRONICS CO., LTD., Suwon-si, Gyeonggi-Do (KR)

(72) Inventors: Se Hun Kim, Yongin-si (KR); Ah Chan Kim, Hwaseong-si (KR); Youn Sik Choi, Yongin-si (KR); Jae Gon Lee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 74 days.

(21) Appl. No.: 15/415,041

(22) Filed: Jan. 25, 2017

(65) Prior Publication Data

US 2017/0212549 A1 Jul. 27, 2017

Related U.S. Application Data

(60) Provisional application No. 62/286,895, filed on Jan. 25, 2016, provisional application No. 62/286,860, filed on Jan. 25, 2016.

(30) Foreign Application Priority Data

Jan. 16, 2017 (KR) ........................ 10-2017-0007002
Jan. 24, 2017 (KR) ........................ 10-2017-0010945

(51) Int. Cl.
*G06F 1/00* (2006.01)
*H04L 5/00* (2006.01)
(Continued)

(52) U.S. Cl.
CPC .............. *G06F 1/06* (2013.01); *G06F 1/3237* (2013.01); *Y02D 10/128* (2018.01); *Y02D 50/20* (2018.01)

(58) Field of Classification Search
None
See application file for complete search history.

(56) References Cited

U.S. PATENT DOCUMENTS

| 5,373,293 A | 12/1994 | Hirata |
| 5,600,839 A | 2/1997 | MacDonald |
(Continued)

FOREIGN PATENT DOCUMENTS

| JP | 11-143570 | 5/1999 |
| JP | 2007-065756 | 3/2007 |
(Continued)

OTHER PUBLICATIONS

U.S. OA dated Jul. 9, 2018 in related U.S. Appl. No. 15/414,969.
(Continued)

*Primary Examiner* — Nitin C Patel
(74) *Attorney, Agent, or Firm* — F. Chau & Associates, LLC

(57) ABSTRACT

A semiconductor device includes a first clock generating circuit including a first control circuit and a first clock gating circuit, a first channel management circuit which communicates with the first clock generating circuit according to a full handshake method, a second clock generating circuit including a second control circuit and a second clock gating circuit, and a second channel management circuit which communicates with the second clock generating circuit according to the full handshake method. The first clock gating circuit outputs a first clock, and the second clock gating circuit outputs a second clock different from the first clock.

15 Claims, 19 Drawing Sheets

(51) Int. Cl.
*G06F 1/06* (2006.01)
*G06F 1/3237* (2019.01)

(56) References Cited

U.S. PATENT DOCUMENTS

| | | |
|---|---|---|
| 5,655,127 A | 8/1997 | Rabe et al. |
| 5,661,751 A | 8/1997 | Johnson |
| 5,793,993 A | 8/1998 | Broedner et al. |
| 5,978,930 A | 11/1999 | Furuta et al. |
| 6,021,501 A | 2/2000 | Shay |
| 6,437,617 B2 | 8/2002 | Saeki |
| 6,654,898 B1 | 11/2003 | Bailey et al. |
| 6,822,481 B1 | 11/2004 | Srikantam et al. |
| 6,889,331 B2 | 5/2005 | Soerensen et al. |
| 6,915,438 B2 | 7/2005 | Boros |
| 6,927,604 B2 * | 8/2005 | Boerstler ............ G06F 1/08 326/93 |
| 7,111,183 B1 | 9/2006 | Klein et al. |
| 7,142,478 B2 | 11/2006 | Suh |
| 7,162,556 B2 | 1/2007 | Fujiki |
| 7,174,467 B1 | 2/2007 | Helms et al. |
| 7,245,161 B2 * | 7/2007 | Boerstler ....... G01R 31/31708 327/407 |
| 7,443,218 B2 | 10/2008 | Onouchi et al. |
| 7,694,042 B2 | 4/2010 | Lee et al. |
| 7,797,561 B1 | 9/2010 | Abdalla et al. |
| 7,813,908 B2 | 10/2010 | Yen et al. |
| 7,971,086 B2 | 6/2011 | Itkin |
| 8,086,975 B2 | 12/2011 | Shiring et al. |
| 8,132,144 B2 | 3/2012 | Sundaresan et al. |
| 8,140,925 B2 | 3/2012 | Bellofatto et al. |
| 8,289,048 B2 | 10/2012 | Cressman |
| 8,291,244 B2 | 10/2012 | Tune |
| 8,375,239 B2 | 2/2013 | Nara et al. |
| 8,533,648 B2 | 9/2013 | Sundaresan et al. |
| 8,572,418 B2 | 10/2013 | Singasani |
| 8,656,196 B2 | 2/2014 | de Cesare et al. |
| 8,826,047 B1 * | 9/2014 | Zhu .................. G06F 1/3206 713/300 |
| 8,898,502 B2 | 11/2014 | Maddigan et al. |
| 8,924,612 B2 | 12/2014 | Maji et al. |
| 8,996,906 B1 * | 3/2015 | Townley ............ G06F 1/06 713/600 |
| 9,081,517 B2 | 7/2015 | Koniaris et al. |
| 9,152,598 B2 | 10/2015 | Fosse et al. |
| 9,172,377 B2 | 10/2015 | Peng |
| 9,766,648 B2 | 9/2017 | Hashim et al. |
| 2002/0152407 A1 | 10/2002 | Alia et al. |
| 2003/0117176 A1 | 6/2003 | Tardieux et al. |
| 2004/0153678 A1 * | 8/2004 | Ahmad ............... G06F 1/3203 713/322 |
| 2004/0243874 A1 | 12/2004 | Byers et al. |
| 2005/0232218 A1 * | 10/2005 | Edwards ............. G06F 1/3203 370/347 |
| 2006/0161797 A1 | 7/2006 | Grass et al. |
| 2006/0248367 A1 | 11/2006 | Fischer et al. |
| 2008/0178024 A1 | 7/2008 | Kamegawa |
| 2008/0301604 A1 | 12/2008 | Itskovich et al. |
| 2009/0150706 A1 | 6/2009 | Oh et al. |
| 2011/0050300 A1 | 3/2011 | Klapproth et al. |
| 2011/0202788 A1 | 8/2011 | Hesse et al. |
| 2012/0131370 A1 | 5/2012 | Wang et al. |
| 2013/0055004 A1 * | 2/2013 | Koniaris ............... G06F 1/10 713/501 |
| 2013/0124895 A1 | 5/2013 | Saha et al. |
| 2013/0173951 A1 * | 7/2013 | Vogel .................. G06F 1/10 713/600 |
| 2014/0082396 A1 | 3/2014 | Vahidsafa et al. |
| 2014/0089697 A1 | 3/2014 | Kim et al. |
| 2014/0266333 A1 * | 9/2014 | Jouin .................. G06F 1/3237 327/142 |
| 2015/0200669 A1 | 7/2015 | Cai et al. |
| 2015/0373313 A1 | 12/2015 | Kinebuchi et al. |
| 2016/0094337 A1 | 3/2016 | Choi et al. |
| 2016/0116934 A1 | 4/2016 | Ha |
| 2016/0350259 A1 | 12/2016 | Jeon et al. |

FOREIGN PATENT DOCUMENTS

| | | |
|---|---|---|
| JP | 2008097594 | 4/2008 |
| JP | 2010-021793 | 1/2010 |
| JP | 5678849 | 3/2015 |
| KR | 1020060064146 | 6/2006 |
| KR | 10-0852885 | 8/2008 |
| KR | 10-1184182 | 9/2012 |
| KR | 10-2016-0038671 | 4/2016 |
| KR | 1020160138786 | 12/2016 |

OTHER PUBLICATIONS

U.S. OA dated Aug. 28, 2018 in related U.S. Appl. No. 15/414,819.
U.S. OA dated Sep. 17, 2018 in related U.S. Appl. No. 15/415,162.
U.S. OA dated Oct. 4, 2018 in related U.S. Appl. No. 15/415,020.

* cited by examiner

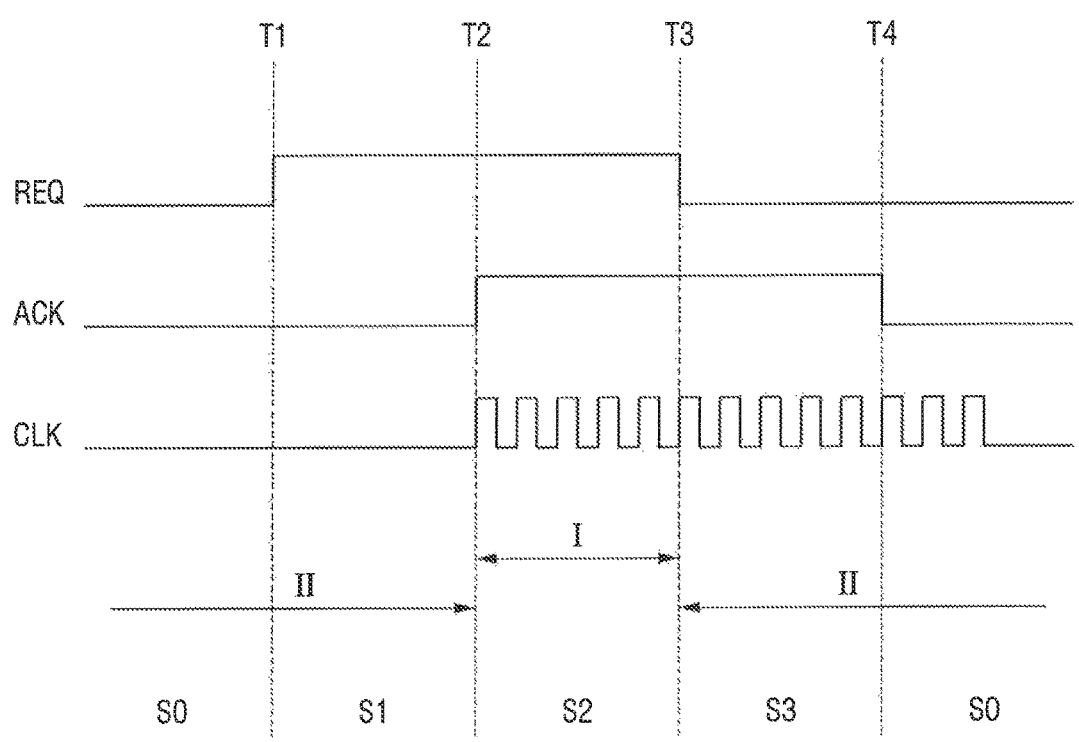

SEMICONDUCTOR DEVICE INCLUDING CLOCK GENERATING CIRCUIT AND CHANNEL MANAGEMENT CIRCUIT

CROSS-REFERENCE TO RELATED APPLICATIONS

This application claims priority to and the benefit of U.S. Provisional Patent Application No. 62/286,895 filed on Jan. 25, 2016, U.S. Provisional Patent Application No. 62/286,860 filed on Jan. 25, 2016, Korean Patent Application No. 10-2017-0007002 filed on Jan. 16, 2017, and Korean Patent Application No. 10-2017-0010945 filed on Jan. 24, 2017, the disclosures of which are incorporated by reference herein in their entireties.

TECHNICAL FIELD

Exemplary embodiments of the present disclosure relate to a semiconductor device including a semiconductor circuit.

DISCUSSION OF THE RELATED ART

With the gradual convergence of computers, communications, broadcasts, etc., the demand for existing application specific integrated circuits (ASICs) and application specific standard products (ASSPs) is changing due to the demand for system-on-chips (SoCs). Further, the trend toward lighter, thinner, more compact and high-performance information technology (IT) devices is a factor accelerating the development of SoCs.

With the development of semiconductor processing technology, SoCs may be implemented into a form in which conventional multi-functional blocks such as, for example, intellectual property (IP) blocks, are integrated on a single chip.

As SoCs increase in integration density and size, and as the operating speed thereof is improved, low power consumption becomes an important factor, since high power consumption may raise the temperature of a chip, resulting in the SoC malfunctioning or the SoC being damaged.

SUMMARY

According to an exemplary embodiment of the present disclosure, a semiconductor device includes a first clock generating circuit including a first control circuit and a first clock gating circuit, a first channel management circuit which communicates with the first clock generating circuit according to a full handshake method, a second clock generating circuit including a second control circuit and a second clock gating circuit, and a second channel management circuit which communicates with the second clock generating circuit according to the full handshake method. The first clock gating circuit outputs a first clock, and the second clock gating circuit outputs a second clock different from the first clock.

According to an exemplary embodiment of the present disclosure, a semiconductor device includes a first clock generating circuit including a first control circuit and a first clock gating circuit, a first channel management circuit which communicates with the first clock generating circuit according to a full handshake method, and a second clock generating circuit including a second control circuit and a second clock gating circuit. The second clock generating circuit communicates with the first channel management circuit according to the full handshake method. The first clock gating circuit outputs a first clock, and the second clock gating circuit outputs a second clock different from the first clock.

According to an exemplary embodiment of the present disclosure, a semiconductor device includes a first clock generating circuit including a first control circuit and a first clock gating circuit, a first channel management circuit which communicates with the first clock generating circuit according to a full handshake method, and a second channel management circuit which communicates with the first clock generating circuit according to the full handshake method. The first channel management circuit transmits a first clock request signal to the first clock generating circuit, and the second channel management circuit transmits a second clock request signal to the first clock generating circuit.

BRIEF DESCRIPTION OF THE DRAWINGS

The above and other features of the present disclosure will become more apparent by describing in detail exemplary embodiments thereof with reference to the accompanying drawings, in which:

FIG. 5A illustrates a clock request signal and a clock acknowledgement signal used in exemplary embodiments of the present disclosure.

DETAILED DESCRIPTION OF THE EXEMPLARY EMBODIMENTS

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Further, when two processes are described as being performed substantially simultaneously or at substantially the same time as each other, it is to be understood that the processes may be performed at exactly the same time or at about the same time as would be understood by a person having ordinary skill in the art.

Further, it will be understood that each of the units described herein may be implemented as and referred to as circuits (e.g., a clock MUX unit be implemented as a circuit and referred to as a clock MUX circuit, a clock gating unit may be implemented as a circuit and referred to as a clock gating circuit, a channel management unit may be implemented as a circuit and referred to as a channel management circuit, etc.).

Figure 1:
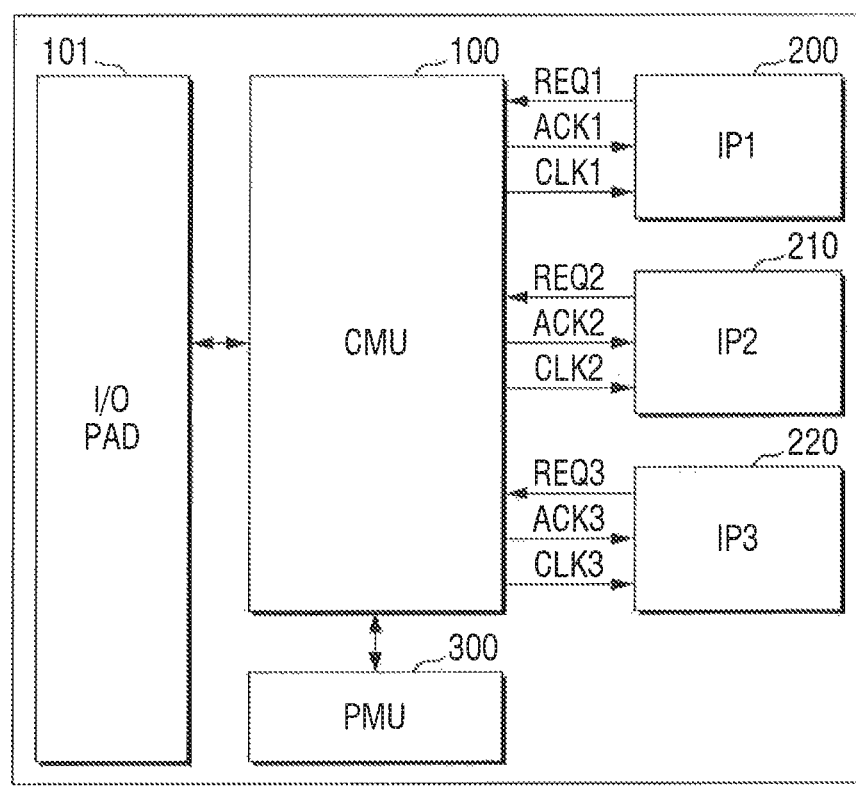
FIG. 1 is a block diagram illustrating a semiconductor device according to exemplary embodiments of the present disclosure.

FIG. 1 is a block diagram illustrating a semiconductor device according to exemplary embodiments of the present disclosure.

Referring to FIG. 1, the semiconductor device according to exemplary embodiments of the present disclosure may include an input/output pad 101, a clock management unit (CMU) 100, a power management unit (PMU) 300, and a logic block. The logic block may be implemented as, for example, at least one intellectual property (IP) block 200, 210 and 220. IP blocks may also be referred to herein as logic blocks.

The clock management unit 100 may generate operation clock signals. The operation clock signals may be provided respectively to first to third IP blocks 200, 210 and 220. For example, the clock management unit 100 may generate first, second and third clock signals CLK1, CLK2 and CLK3, and respectively provide these clock signals to first to third IP blocks 200, 210 and 220.

Each of the first, second and third IP blocks 200, 210 and 220 may be connected to a system bus. The first, second and third IP blocks 200, 210 and 220 may communicate with one another through the system bus. In exemplary embodiments of the present disclosure, each of the first, second and third IP blocks 200, 210 and 220 may include, for example, a processor, a graphic processor, a memory controller, an input/output interface block, etc.

The clock management unit 100 may provide the first clock signal CLK1 to the first IP block 200, the second clock signal CLK2 to the second IP block 210, and the third clock signal CLK3 to the third IP block 220.

One of the first, second and third IP blocks 200, 210 and 220 may transmit a clock request signal to the clock management unit 100 according to a full handshake method.

For example, the first IP block 200 may transmit a first clock request signal REQ1 to the clock management unit 100 according to a full handshake method. The clock management unit 100 may receive the first clock request signal REQ1, and transmit a first clock acknowledgement signal ACK1 to the first IP block 200. The clock management unit 100 may substantially simultaneously transmit the first clock signal CLK1 to the first IP block 200. Similarly, the second and third IP blocks 210 and 220 may respectively transmit a second and third clock request signal REQ2 and REQ3 to the clock management unit 100, and the clock management unit 100 may respectively transmit a second and third clock acknowledgment signal ACK2 and ACK3 to the second and third IP blocks 210 and 220.

In exemplary embodiments of the present disclosure, an interface between the clock management unit 100 and the first, second and third IP blocks 200, 210 and 220 may adopt a format of a full handshake method. In exemplary embodiments of the present disclosure, the interface may be implemented to comply with Q-channel interface or P-channel interface of ARM Holdings, Ltd., but the scope of the present disclosure is not limited thereto.

Clock gating is a technique for grouping a computer system into small functional blocks, acid turning off the power in a block which is not used. When using a computer, not all parts of a computer system will operate at all times. Thus, a block in a part(s) which is not used can be switched off to save power, and heat which might otherwise be generated from the block can be reduced.

The clock management unit 100 according to exemplary embodiments of the present disclosure may perform, sequentially from a rear end of the IP blocks, clock gating on the IP block which does not need an operation clock from among the first, second and third IP blocks 200, 210 and 220 such that clock gating is automatically performed without causing an error to an operation of the IP blocks. As a result, power consumption may be reduced.

The power management unit 300 may control power being supplied to the semiconductor device. For example, when the semiconductor device enters a standby mode, the power management unit 300 may turn off a power control circuit so as to cut off power being supplied to the semiconductor device. In this case, the power management unit 300 may continuously consume power, but the power being consumed by the power management unit 300 may be significantly smaller than the power being supplied in the whole of the semiconductor device. Thus, power consumption in the semiconductor device may be substantially reduced in a standby mode.

For example, the power management unit 300 may cut off the power being supplied to the clock management unit 100 when the semiconductor device is in a standby mode. This may occur when the first, second and third IP blocks 200, 210 and 220 do not make a clock request.

Figure 2:
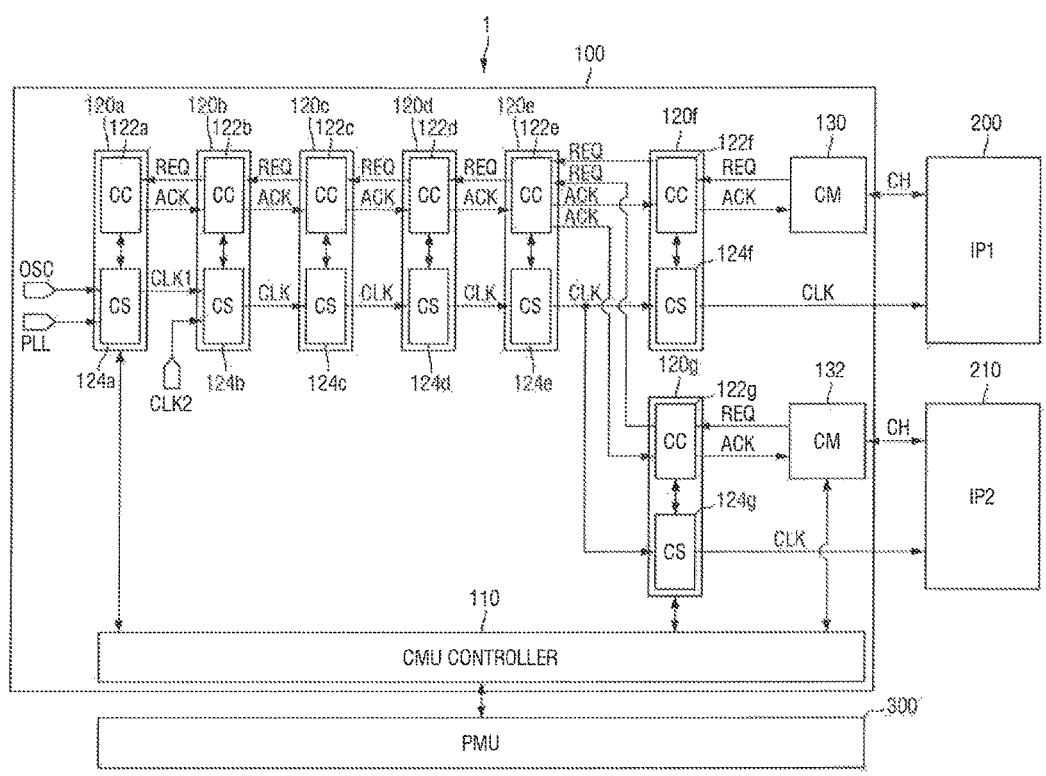
FIG. 2 is a block diagram illustrating a clock management unit included in a semiconductor device according to exemplary embodiments of the present disclosure.

FIG. 2 is a block diagram illustrating a clock management unit 100 included in a semiconductor device according to exemplary embodiments of the present disclosure.

Referring to FIG. 2, the clock management unit 100 may include clock components 120a, 120b, 120c, 120d, 120e, 120f and 120g (also referred to as clock generating circuits), channel management (CMM) circuits 130 and 132, and a clock management unit (CM) controller 110. The clock components 120a, 120b, 120c, 120d, 120e, 120f and 120g may generate clock signals to be provided to the IF blocks 200 and 210. The CM circuits 130 and 132 may be respectively disposed between the clock components 120f and 120g and the IP blocks 200 and 210 so as to provide a communication channel CH between the clock management unit 100 and the IP blocks 200 and 210. The CMU controller 110 may provide a clock signal to the IP blocks 200 and 210 using the clock components 120a, 120b, 120c, 120d, 120e, 120f and 120g. As shown in FIG. 2, in an exemplary embodiment, the clock component 120b may receive a clock from the clock component 120a (e.g., CLK1) or a clock from, for example, an external device (e.g., from another CMU other than the CMU 100) (e.g., CLK2).

In exemplary embodiments of the present disclosure, the communication channel CH provided by the CM circuits 130 and 132 may be implemented to accord to a low power interface (LPI), Q-channel interface or P-channel interface of ARM Holdings, Ltd., but the scope of the present disclosure is not limited thereto. For example, according to exemplary embodiments, the communication channel CH can be implemented as those which comply with a certain preset communication protocol depending on purposes of implementation.

The clock components 120a, 120b, 120c, 120d, 120e, 120f and 120g may respectively include clock sources CSs 124a, 124b, 124c, 124d, 124e, 124f and 124g, and clock control circuits CCs 122a, 122b, 122c, 122d, 122e, 122f and 122g (also referred to as control circuits) for controlling the respective clock sources 124a, 124b, 124c, 124d, 124e, 124f and 124g. The clock sources CSs 124a, 124b, 124c, 124d, 124e, 124f and 124g may include, for example, a multiplexer (MUX) circuit, a clock dividing circuit, a short stop circuit, a clock gating circuit, etc.

The clock components 120a, 120b, 120c, 120d, 120e, 120f and 120g may form a parent-child relationship among them. In the embodiment shown in FIG. 2, the clock component 120a may be a parent of the clock component 120b, and the clock component 120b may be a child of the clock component 120a and a parent of the clock component 120c. Further, the clock component 120e may be a parent of the two clock components 120f and 120g, and the clock components 120f and 120g may be children of the clock component 120e. In the exemplary embodiment shown in FIG. 2, the clock component 120a disposed most adjacent to a phase locked loop (PLL) may be a root clock component, and the clock components 120f and 120g disposed most adjacent to the IP blocks 200 and 210 may be leaf clock components. The above-described parent-child relationship may also be formed among the clock control circuits 122a, 122b, 122c, 122d, 122e, 122f and 122g, and among the clock sources 124a, 124b, 124c, 124d, 124e, 124f and 124g according to the parent-child relationship formed among the clock components 120a, 120b, 120c, 120d, 120e, 120f and 120g.

The clock control circuits 122a, 122b, 122c, 122d, 122e, 122f and 122g may transmit and receive clock requests REQs and acknowledgements ACKs between parents and children, and provide clock signals to the IP blocks 200 and 210.

For example, when the IP block 200 does not need a clock signal, for example, when the IP block 200 is entering a sleep state, the clock management unit 100 may stop providing a clock signal to the IP block 200.

For example, the CM circuit 130 may transmit a first signal indicating stoppage of the clock signal to the IP block 200 under the control of the clock management unit 100 or the CMU controller 110. The IP block 200 which has received the first signal may finish the work under processing, and then transmit a second signal to the CM circuit 130 indicating that the clock signal may be stopped. The CM circuit 130 may receive the second signal from the IP block 200, and then request the clock component 120f, which is its parent, to stop providing the clock signal.

In one example, when the communication channel CH provided by the CM circuit 130 complies with Q-channel interface, the CM circuit 130 may transmit, to the IP block 200, a QREQn signal having a first logic value (for example, logic low, which will hereinafter be denoted by L), as a first signal. Subsequently, the CM circuit 130 may receive, from the IP block 200, a QACCEPTn signal having, for example, a first logic value, as a second signal, and then transmit a clock request REQ having, for example, a first logic value, to the clock component 120f. In this case, the clock request REQ having a first logic value may mean "a request to stop clock provision".

The clock control circuit 122f which has received, from the CM circuit 130, the clock request REQ having a first logic value (e.g., the request to stop clock provision), may disable the clock source 124f (e.g., a clock gating circuit) so as to stop provision of the clock signal. As a result, the IP block 200 may enter a sleep mode. During the process, the clock control circuit 122f may provide an acknowledgement ACK having a first logic value to the CM circuit 130. The CM circuit 130, which has transmitted the request to stop clock provision having a first logic value and then received the acknowledgement ACK having a first logic value, does not ensure stoppage of clock provision from the clock source 124f. However, the acknowledgement ACK indicates that the clock control circuit 122f has recognized that the clock component 120f, which is a parent of the CM circuit 130, does not need to provide a clock to the CM circuit 130 any longer.

The clock control circuit 122f of the clock component 120f may transmit a clock request REQ having a first logic value to the clock control circuit 122e of the clock component 120e, which is its parent. If the IP block 210 also does not need a clock signal, when, for example, the clock control circuit 122e has received a request to stop clock provision from the clock control circuit 122g, the clock control circuit 122e may disable the clock source 124e (e.g., a clock diving circuit) so as to stop providing a clock signal. Thus, the IP blocks 200 and 210 may enter a sleep mode.

This operation may be performed in a similar manner on the other clock control circuits 122a, 122b, 122c and 122d.

When the clock control circuit 122f of the clock component 120f transmits a clock request REQ having a first logic value to the clock control circuit 122e of the clock component 120e, which is its parent, but the IP block 210 is in a running state (e.g., is not entering a sleep state), the clock control circuit 122e may not disable the clock source 124e. When the IP block 210 does not need a clock signal any longer afterward, the clock control circuit 122e may then disable the clock source 124e and transmit a clock signal REQ having a first logic value to the clock control circuit 122d, which is its parent. That is, the clock control circuit 122e may disable the clock source 124e only when the clock control circuit 122e has received requests to stop clock provision from both the clock control circuits 122f and 122g, which are its children.

When the IP blocks 200 and 210 are in a sleep state, and all of the clock sources 124a, 124b, 124c, 124d, 124e and 124f are disabled and the IP block 200 enters a running state, the clock management unit 100 may restart providing a clock signal to the IP blocks 200 and 210.

The CM circuit 130 may transmit a clock request REQ having a second logic value (e.g., logic high, which will hereinafter be denoted by H) to the clock control circuit 122f of the clock component 120f, which is its parent, and wait for an acknowledgement ACK from the clock control circuit 122f. In this case, the clock request REQ having a second logic value may mean "a request for clock provision", and the acknowledgement ACK for the request for clock provision may mean that the clock source 124f has restarted clock provision. The clock control circuit 122f may not directly enable the clock source 124f (e.g., a clock gating circuit), and may wait for provision of a clock signal from its parent.

The clock control circuit 122f may then transmit a clock request REQ having a second logic value, that is, a request for clock provision, to the clock control circuit 122e, which is its parent, and wait for an acknowledgement ACK from the clock control circuit 122e. This operation may be performed in a similar manner on the clock control circuits 122a, 122b, 122c and 122d.

The clock control circuit 122a, which is a root clock component having received a clock request REQ having a second logic value from the clock control circuit 122b may disable the clock source 124a (e.g., a multiplexer circuit), and transmit an acknowledgement ACK to the clock control circuit 122b. When the clock sources 124b, 124c, 124d, 124e and 124f are sequentially disabled by the method described above, the clock control circuit 122e may then transmit an acknowledgement ACK to the clock control circuit 122f notifying it that the clock source 124e has restarted providing a clock. The clock control circuit 122f which has received the acknowledgement ACK may then enable the clock source 124f to provide a clock signal to the IP block 200, and provide an acknowledgement ACK to the CM circuit 130.

As described above, the clock control circuits 122a, 122b, 122c, 122d, 122e, 122f and 122g may operate according to a full handshake method in which a parent and children transmit and receive a clock request REQ and an acknowledgement ACK therebetween. That is, according to exemplary embodiments of the present disclosure, a full handshake method refers to an operation in which a parent and child transmit and receive a clock request REQ and an acknowledgment request ACK therebetween. Thus, the clock control circuits 122a, 122b, 122c, 122d, 122e, 122f and 122g may control the clock sources 124a, 124b, 124c, 124d, 124e, 124f and 124g in terms of hardware so as to control the clock signals provided to the IP blocks 200 and 210.

The clock control circuits 122a, 122b, 122c, 122d, 122e, 122f and 122g may operate autonomously so as to transmit a clock request REQ to their parents or control the clock sources 124a, 124b, 124c, 124d, 124e, 124f and 124g, and operate under the control of the CMU controller 110. In exemplary embodiments of the present disclosure, the clock control circuits 122a, 122b, 122c, 122d, 122e, 122f and 122g may include a finite state machine (FSM) for controlling each of the clock sources 124a, 124b, 124c, 124d, 124e, 124f and 124g according to the clock request REQ transmitted and received between parents and children.

According to exemplary embodiments, the clock component 120f may communicate with the channel management circuit 130 according to a full handshake method, and may output a first clock to the IP block 200. Further, the clock component 120g may communicate with the channel management circuit 132 according to a full handshake method, and may output a second clock different from the first clock to the IP block 210.

Figure 3:
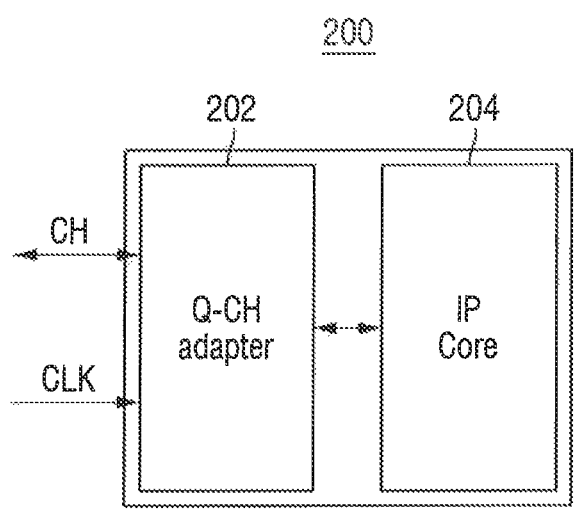
FIG. 3 is a block diagram illustrating an intellectual property (IP) block included in a semiconductor device according to exemplary embodiments of the present disclosure.

FIG. 3 is a block diagram illustrating an intellectual property (IP) block included in a semiconductor device according to exemplary embodiments of the present disclosure.

Referring to FIG. 3, the first IP block 200 may include a channel adapter 202 and an IP core 204. FIG. 3 illustrates the IP block 200 as an example. It is to be understood that the second and third IP blocks 210 and 220 may include substantially the same components.

The channel adapter 202 may communicate with the first CM circuit 130 according to a full handshake method. The channel adapter 202 may be, for example, a Q-channel adapter. The first IP block 200 may transmit the first clock request signal REQ1 and receive the first clock signal CLK1 through the channel adapter 202. Alternatively, the first IP block 200 may transmit the first clock request signal REQ1 and receive an acknowledgement ACK signal indicating an existence of a clock through the channel adapter 202, and receive the first clock signal CLK1 directly from the clock component controlled by the channel adapter 202.

The IP core 204 may include, for example, a processor, a graphic processor, a memory controller, an input/output interface block, etc.

Figure 4:
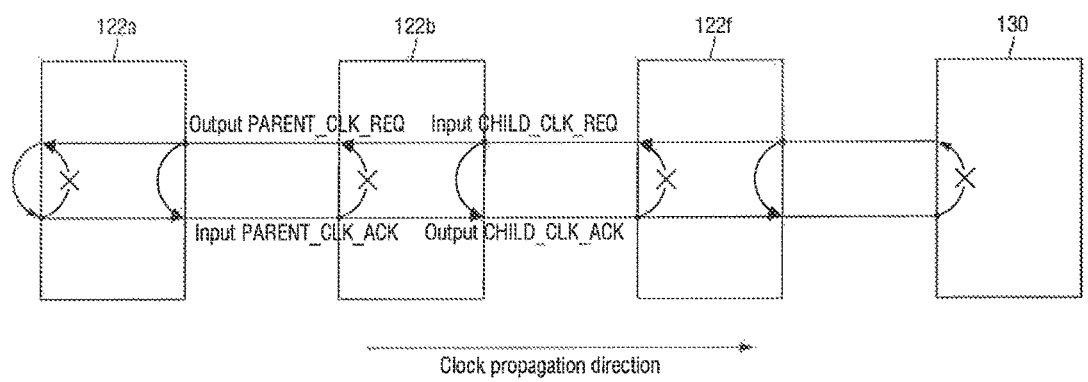
FIG. 4 illustrates a signal transmission path among a plurality of control circuits according to exemplary embodiments of the present disclosure.

FIG. 4 illustrates a signal transmission path among a plurality of control circuits according to exemplary embodiments of the present disclosure.

Referring to FIG. 4, the plurality of clock control circuits may operate using a handshake signal including a clock request signal REQ and an acknowledgement signal ACK (also referred to as a clock acknowledgement signal). The clock request signal REQ and the clock acknowledgement signal ACK may have, for example, the first logic value (for example, logic low) and the second logic value (for example, logic high), but the method for implementing the clock request signal REQ and the clock acknowledgement signal ACK is not limited thereto.

In exemplary embodiments of the present disclosure, a clock consumer may deliver information indicating that a clock is needed, to a clock provider, by transmitting a clock request signal REQ having, for example, a second logic value, to the clock provider. Alternatively, the clock consumer may deliver information indicating that a clock is not needed any longer, to the clock provider, by transmitting a clock request signal REQ having, for example, a first logic value to the clock provider.

The clock provider may transmit a clock acknowledgement signal ACK having, for example, a second logic value, to the clock consumer, indicating that a clock signal is being stably provided to the clock consumer from the clock provider. Alternatively, the clock provider may transmit a clock acknowledgement signal ACK having a first logic value to the clock consumer, indicating that the clock provider is not capable of notifying, to the clock consumer, whether a clock signal is being provided.

For example, the clock control circuit 122b may transmit, from a position of the clock consumer, a clock request signal (PARENT_CLK_REQ) having, for example, a second logic value, to the clock control circuit 122a, thereby transmitting information indicating that a clock is needed, to the clock control circuit 122a, which is the clock provider. The clock component (that is, the clock provider) including the clock control circuit 122a may provide a clock signal to the clock component (that is, the clock consumer) including the clock control circuit 122b, and the clock control circuit 122b may then receive a clock acknowledgement signal (PARENT_CLK_ACK) having, for example, a second logic value, from the clock control circuit 122a.

The clock control circuit 122b may receive, at a position of the clock provider, a clock request signal (CHILD_CLK_REQ) having, for example, a second logic value, from the clock control circuit 122f, which indicates that the clock control circuit 122f, which is the clock consumer, needs a clock. The clock component (that is, the clock provider) including the clock control circuit 122b may then provide a clock signal to the clock component (that is, the clock consumer) including the clock control circuit 122f, and the clock control circuit 122b may then transmit, from a position of the clock provider, a clock acknowledgement signal (CHILD_CLK_ACK) having, for example, a second logic value, to the clock control circuit 122f.

As another example, the clock control circuit 122b may transmit, from a position of the clock consumer, a clock request signal (PARENT_CLK_REQ) having, for example, a first logic value, to the clock control circuit 122a, thereby delivering information indicating that a clock is not needed any longer, to the clock control circuit 122a, which is a clock provider. The clock control circuit 122b may then receive a clock acknowledgement signal (PARENT_CLK_ACK) having, for example, a first logic value, from the clock control circuit 122a, indicating that provision of a clock from the clock provider is not ensured (e.g., the clock control circuit 122a (the clock provider) is not capable of notifying the clock control circuit 122 (the clock consumer) whether the requested clock signal is being provided).

The clock control circuit 122b may receive, at a position of the clock provider, a clock request signal (CHILD_CLK_REQ) having, for example, a first logic value, from the clock control circuit 122f, indicating that the clock control circuit 122f, which is the clock consumer, does not need a clock any longer. The clock control circuit 122b may then transmit a clock acknowledgement signal (CHILD_CLK_ACK) having, for example, a first logic value, to the clock control circuit 122f, indicating that provision of a clock from the clock provider is not ensured.

A combinational path among the clock control circuits described above may include a path in which the clock control circuit 122b transmits a clock request signal (PARENT_CLK_REQ) to the clock control circuit 122a, which is its parent, and then the clock control circuit 122b receives a clock acknowledgement signal (PARENT_CLK_ACK) from the clock control circuit 122a, which is its parent, and a path in which the clock control circuit 122b receives a clock request signal (CHILD_CLK_REQ) from the clock control circuit 122f, which is its child, and then the clock control circuit 122b transmits a clock acknowledgement signal (CHILD_CLK_ACK) to the clock control circuit 122f, which is its child, but may not include a path in Which the clock control circuit 122b receives the clock acknowledgement signal (PARENT_CLK_ACK) from the clock control circuit 122a, which is its parent, and then transmits the clock request signal (PARENT_CLK_REQ) to the clock control circuit 122a, which is its parent (shown as "X" in FIG. 4).

The clock request signal REQ and the clock acknowledgement signal ACK described above may be implemented according to a general full handshake method, and the clock provider and the clock consumer may belong to the same single clock domain or clock domains different from each other. When a clock provider and a clock consumer belong to a single clock domain, they operate in response to a same reference clock signal. When a clock provider and a clock consumer belong to different clock domains, they operate in response to different reference clock signals.

In exemplary embodiments of the present disclosure, a clock multiplexer circuit, a clock dividing circuit, a clock gating circuit, etc. connected to and communicating with the respective clock control circuits may use a clock domain different from those of the clock control circuits. That is, the clock frequency in a signal line transmitting a clock request signal and the clock frequency of an actually provided operating clock may be different from each other.

Figure 5B:
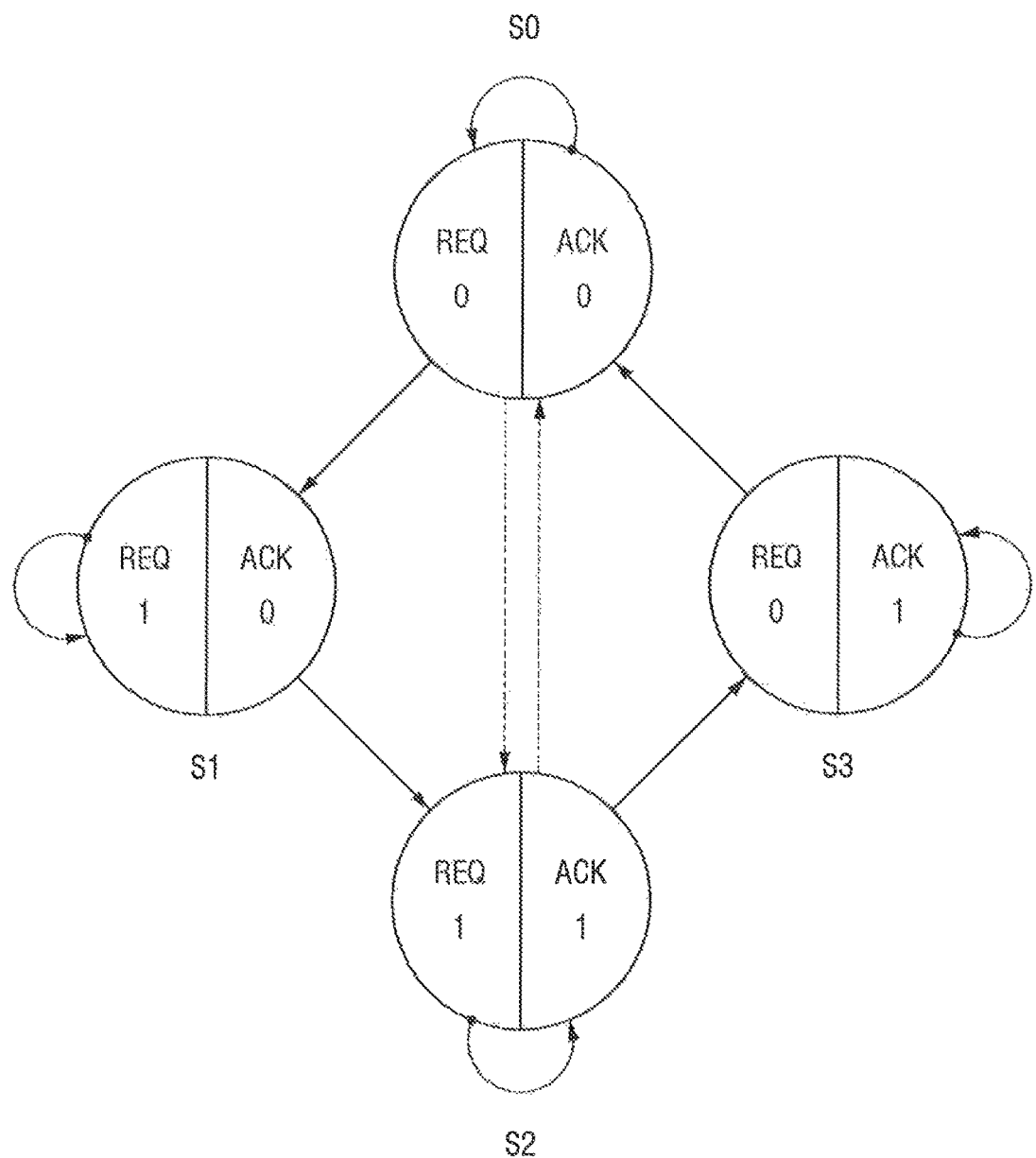
FIG. 5B illustrates a clock level transition for the clock request signal and the clock acknowledgement signal used in exemplary embodiments of the present disclosure.

FIG. 5A illustrates a clock request signal and a clock acknowledgement signal used in exemplary embodiments of the present disclosure. FIG. 5B illustrates a clock level transition for the clock request signal and the clock acknowledgement signal used in exemplary embodiments of the present disclosure.

Referring to FIG. 5A, the transition of the clock request signal REQ to a second logic value at time T1 may indicate that the clock consumer transmits, to the clock provider, information indicating that a clock signal CLK is needed. The clock provider may provide a clock signal CLK to the clock consumer after time T1.

At time T2, the clock provider may transmit a clock acknowledgement signal ACK having a second logic value to the clock consumer, which may indicate that a clock signal CLK is being stably provided to the clock consumer from the clock provider (see section I).

At time T3, the transition of the clock request signal REQ to a first logic value may indicate that the clock consumer transmits, to the clock provider, information indicating that a clock signal CLK is not needed any longer. After time T3, the clock provider may stop providing the clock signal CLK to the clock consumer, or still continue providing the clock signal CLK.

At time T4, the clock provider may transmit, to the clock consumer, a clock acknowledgement signal ACK having a first logic value, which may indicate that the clock provider is not capable of notifying, to the clock consumer, whether a clock signal is being provided.

Thus, referring to FIG. 5A, section I is the only section in which the clock signal CLK is being stably provided from the clock provider to the clock consumer, and whether the clock signal CLK is being provided from the clock provider to the clock consumer is unknown in the other sections II.

FIG. 5B represents a possible combination of the clock request signal REQ and the clock acknowledgement signal ACK, and a possible transition between the two signals when the second logic value is represented by 1 and the first logic value is represented by 0.

Referring to both FIG. 5A and FIG. 5B, state S0 indicates a state before time T1 and a state after time T4, and state S1 indicates a state from time T1 to time T2. In addition, state S2 indicates a state from time T2 to time T3, and state S3 indicates a state from time T3 to time T4. A combination of the clock request signal REQ and the clock acknowledgement signal ACK may change in the order of state S0, state S1, state S2, state S3, and state S0 (see arrows in a solid line).

When a circuit is implemented such that the clock request signal REQ is transitioned to a second logic value and the clock acknowledgement signal ACK is substantially simultaneously transitioned to a second logic value at time T1, a combination of values of the clock request signal REQ and the clock acknowledgement signal ACK may be transitioned directly to state S2 from state S0. Similarly, when a circuit is implemented such that the clock request signal REQ is transitioned to a first logic value and the clock acknowledgement signal ACK is substantially simultaneously transitioned to a first logic value at time T3, a combination of values of the clock request signal REQ and the clock acknowledgement signal ACK may be transitioned directly to state S0 from state S2 (see arrows in dotted lines).

A full handshake method according to exemplary embodiments of the present disclosure will be described with reference to FIGS. 1, 2, and 4.

The full handshake method is configured to enable the first IP block 200 to activate the first clock request signal REQ1 when the first IP block 200 needs a clock. For example, the first IP block 200 may turn the first clock request signal REQ1 to a high state.

The clock management unit 100 may activate the first clock acknowledgement signal ACK1 to the first clock request signal REQ1 in response to the activation of the first clock request signal REQ1. That is, the clock management unit 100 may turn the first clock acknowledgement signal ACK1 to a high state.

The clock management unit 100 may transmit the first clock signal CLK1 to the first IP block 200 prior to the activation of the first clock acknowledgement signal ACK1. Alternatively, the clock management unit 100 may transmit the first clock signal CLK1 to the first IP block 200 substantially simultaneously with the activation of the first clock acknowledgement signal ACK1.

When the first IP block 200 does not need a clock, the first IP block 200 may deactivate the first clock request signal REQ1. That is, the first IP block 200 may turn the first clock request signal REQ1 to a low state.

When the first clock request signal REQ1 is in a low state, the clock management unit 100 may turn the first clock acknowledgement signal ACK1 to a low state. In addition, the clock management unit 100 may substantially simultaneously deactivate the first clock signal CLK1.

The first IP block 200 can operate normally while the first clock acknowledgement signal ACK1 is in the activated state.

A full handshake method of the clock management unit 100 according to exemplary embodiments of the present disclosure will now be described with reference to FIGS. 1 and 2. The description will be made under the assumption that the clock components 120a, 120b, 120c, 120d, 120e and 120f of FIG. 2 are respectively a phase locked loop (PLL) controller, a clock MUX unit, a first clock dividing unit, a short stop circuit, a second clock dividing unit, and a first clock gating unit. However, it is to be understood that this is merely an exemplary embodiment, and the scope of the present disclosure is not limited thereto.

Each of the PLL controller, the clock MUX unit, the first clock dividing unit, the short stop circuit, the second clock dividing unit, and the first clock gating unit may include the clock sources 124a, 124b, 124c, 124d, 124e and 124f.

For example, the PLL controller may include an oscillator OSC and a clock MUX circuit for taking, as an input, a PLL. The clock MUX unit may include a clock MUX circuit for taking, as an input, a plurality of clock signals. The first clock dividing unit may include a first clock dividing circuit. The short stop circuit may include a first clock gating circuit. The second clock dividing unit may include a second clock dividing circuit. The first clock gating unit may include a second clock gating circuit.

Further, the PLL controller may include the clock control circuit 122a. The clock MUX unit may include the clock control circuit 122b. The first clock dividing unit may include the clock control circuit 122e. A short stop circuit 114 may include the clock control circuit 122d. The second clock dividing unit may include the clock control circuit 122e. The first clock gating unit may include the clock control circuit 122f.

Each of the clock control circuits 122a, 122b, 122c, 122d, 122e and 122f may communicate according to a full handshake method. For example, each of the clock control circuits 122a and 122b may support a full handshake method between the PLL controller and the clock MUX unit.

Each of the clock control circuits 122b and 122c may support a full handshake method between the clock MUX unit and the first clock dividing unit.

Each of the clock control circuits 122c and 122d may support a full handshake method between the first clock dividing unit and the short stop circuit.

Each of the clock control circuits 122d and 122e may support a full handshake method between the short stop circuit and the second clock dividing unit.

Each of the clock control circuits 122e and 122f may support a full handshake method between the second clock dividing unit and the first clock gating unit.

Similarly, each of the clock control circuit 122f and the CM circuit 130 may support a full handshake method between the first clock gating unit and the CM circuit 130.

According to exemplary embodiments of the present disclosure, a clock request signal may indicate that the corresponding IP block desires for the CMU 100 to provide it with a clock signal or desires for the CMU 100 to stop providing it with the clock signal. According to exemplary embodiments, in a full handshake method, the CMU 100 responds to a clock request signal with a clock acknowledgement signal indicating it is currently providing or is about to provide the requested clock signal, or it has stopped providing or is about to stop providing the requested clock signal, and the CMU 100 responds with a clock acknowledgement signal indicating only that it is acknowledging receipt of the clock request signal without providing information on the state of the clock signal. Thus, in exemplary embodiments, the full handshake method may refer to connected clock components (e.g., a parent clock component and a child clock component) exchanging a clock request signal and a clock acknowledgement signal therebetween.

The first IP block 200 may make a request for an operation clock to the clock management unit 100 according to a full handshake method. For example, the IP block 200 may activate a clock request signal when an operation clock is needed. That is, the first IP block 200 may transmit an activated clock request signal to the clock management unit 100 when an operation clock is needed.

The CM circuit 130 may receive the activated clock request signal. The CM circuit 130 may transmit the activated clock request signal to the first clock gating unit. The first clock gating unit may transmit the activated clock request signal to the second clock dividing unit. The second clock dividing unit may transmit the activated clock request signal to the short stop circuit. The short stop circuit may transmit the activated clock request signal to the first clock dividing unit. The first clock dividing unit may transmit the activated clock request signal to the clock MUX unit. The clock MUX unit may transmit the activated clock request signal to the PLL controller.

In exemplary embodiments of the present disclosure, each of the PLL controller, the clock MUX unit, the first clock dividing unit, the short stop circuit, the second clock dividing unit, the first clock gating unit, and the first CM circuit 130 may be implemented as a combinational circuit. Accordingly, the activated clock request signal can be transmitted from the first CM circuit to the PLL controller at a time.

The PLL controller may activate a clock acknowledgement signal with respect to the activated clock request signal. That is, the PLL controller may transmit, to the clock MUX unit, a clock acknowledgement signal in response to the activated clock request signal. At substantially the same time, the PLL controller may transmit a clock signal CLK to the clock MUX unit.

The clock MUX unit may transmit the activated clock acknowledgement signal to the first clock dividing unit. At substantially the same time, the clock MUX unit may transmit the clock signal CLK to the first clock dividing unit.

The first clock dividing unit may transmit the activated clock acknowledgement signal to the short stop circuit. At substantially the same time, the first clock dividing unit may transmit the clock signal CLK to the short stop circuit.

The short stop circuit may transmit the activated clock acknowledgement signal to the second clock dividing unit. At substantially the same time, the short stop circuit may transmit the clock signal CLK to the second clock dividing unit.

The second clock dividing unit may transmit the activated clock acknowledgement signal to the first gating unit. At substantially the same time, the second clock dividing unit may transmit the clock signal CLK to the first clock gating unit.

The first clock gating unit may transmit the activated clock acknowledgement signal to the first CM circuit 130. At substantially the same time, the first clock gating unit may provide the clock signal CLK to the first IP block 200.

Thus, as can be seen, in an exemplary embodiment, the clock acknowledgement signal can be transmitted from the PLL controller to the first CM circuit at a time.

The first IP block 200 may deactivate the clock request signal when a clock is not needed. That is, the first IP block 200 may transmit the deactivated clock request signal to the clock management unit 100 when a clock is not needed.

The CM circuit 130 may receive the deactivated clock request signal. The CM circuit 130 may transmit the deactivated clock request signal to the first clock gating unit. The first clock gating unit may transmit the deactivated clock request signal to the second clock dividing unit. The second clock dividing unit may transmit the deactivated clock request signal to the short stop circuit. The short stop circuit may transmit the deactivated clock request signal to the first clock dividing unit. The first clock dividing unit may transmit the deactivated clock request signal to the clock MUX unit. The clock MUX unit may transmit the deactivated clock request signal to the PLL controller.

Each of the PLL controller, the clock MUX unit, the first clock dividing unit, the short stop circuit, the second clock dividing unit, the first clock gating unit, and the first CM circuit 130 may be implemented as a combinational circuit. Accordingly, the deactivated clock request signal can be transmitted from the first CM circuit to the PLL controller at a time.

The PLL controller may deactivate a clock acknowledgement signal with respect to the deactivated clock request signal. That is, the PLL controller may transmit, to the clock MUX unit, the deactivated clock acknowledgement signal. At substantially the same time, the PLL controller may deactivate a clock signal CLK, and may still transmit the clock signal CLK to the clock MUX unit.

The clock MUX unit may transmit the deactivated clock acknowledgement signal to the first clock dividing unit. At substantially the same time, the clock MUX unit may deactivate the clock signal CLK, and may still transmit the clock signal CLK to the first clock dividing unit.

The first clock dividing unit may transmit the deactivated clock acknowledgement signal to the short stop circuit. At substantially the same time, the first clock dividing unit may deactivate the clock signal CLK, and may still transmit the clock signal CLK to the short stop circuit.

The short stop circuit may transmit the deactivated clock acknowledgement signal to the second clock dividing unit. At substantially the same time, the short stop circuit may deactivate the clock signal CLK, and may still transmit the clock signal CLK to the second clock dividing unit.

The second clock dividing unit may transmit the deactivated clock acknowledgement signal to the first clock gating unit. At substantially the same time, the second clock dividing unit may deactivate the clock signal CLK, and may still transmit the clock signal CLK to the first clock gating unit.

The first clock gating unit may transmit the deactivated clock acknowledgement signal to the CM circuit 130. At substantially the same time, the first clock gating unit may deactivate the clock signal CLK.

Similarly, the clock acknowledgement signal can be transmitted from the PLL controller to the first CM circuit 130 at a time.

Figure 6:
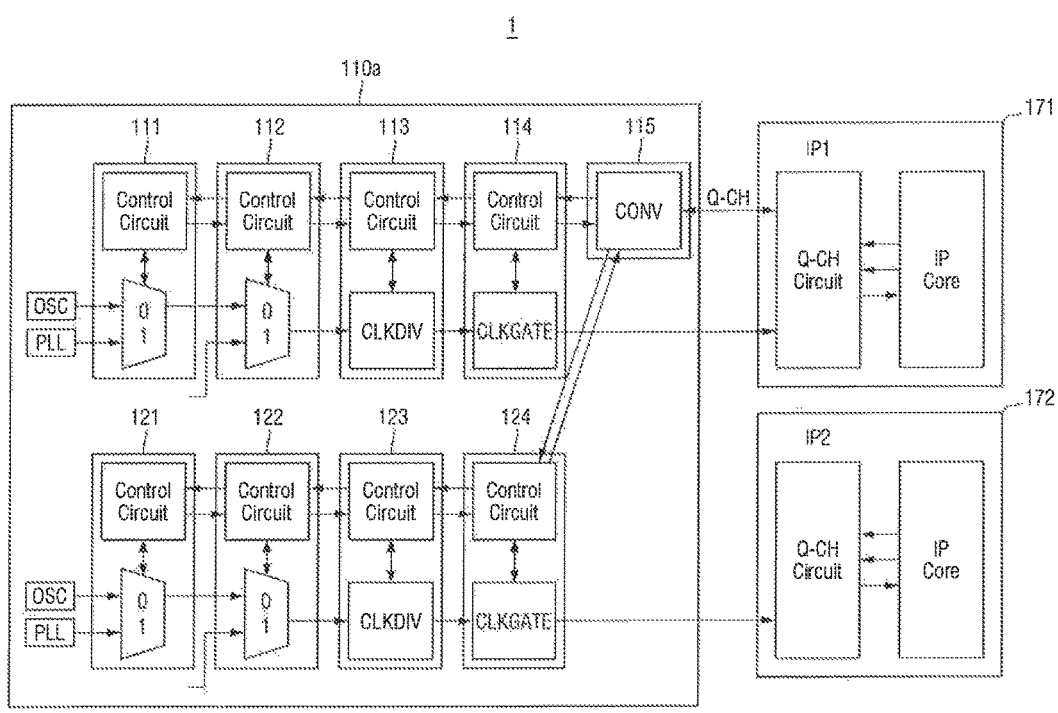
FIG. 6 is a block diagram illustrating a semiconductor device according to exemplary embodiments of the present disclosure.

FIG. 6 is a block diagram illustrating a semiconductor device according to exemplary embodiments of the present disclosure.

Referring to FIG. 6, a clock management unit 110a in a semiconductor device 1 according to exemplary embodiments of the present disclosure may include a first PLL controller 111 (also referred to as a first PLL controller circuit), a first clock MUX unit 112 (also referred to as a first clock MUX circuit), a first clock dividing unit 113 (also referred to as a first clock dividing circuit or a first clock dividing component), a first clock gating unit 114 (also referred to as a first clock gating circuit), a first channel management unit 115 (also referred to as a first channel management circuit), a second PLL controller 121 (also referred to as a second PLL controller circuit), a second clock MUX unit 122 (also referred to as a second clock MUX circuit), a second clock dividing unit 123 (also referred to as a second clock dividing circuit), and a second clock gating unit 124 (also referred to as a second clock gating circuit). According to exemplary embodiments, some of these components may be omitted or duplicated in the clock management unit 110a.

FIG. 6 illustrates an exemplary embodiment in which an operation of a second IP block 172 is dependent on an operation of a first IP block 171. For example, FIG. 6 illustrates an exemplary embodiment in which the second IP block 172 operates whenever the first IP block 171 operates. Thus, according to exemplary embodiments, the second IP block 172 has the possibility to operate when the first IP block 171 operates.

The first channel management unit 115 may communicate with the first clock gating unit 114 and/or the second clock gating unit 124 according to a full handshake method. For example, when the first IP block 171 transmits a clock request signal REQ to the first channel management unit 115, the first channel management unit 115 may transmit the clock request signal REQ to the first clock gating unit 114.

The first PLL controller 111, the first clock MUX unit 112, the first clock dividing unit 113, the first clock gating unit 114, and the first channel management unit 115 may communicate with one another according to a full handshake method, and the clock request signal REQ can be transmitted from the first channel management unit 115 to the first PLL controller 111 at a time. The first clock MUX unit 112 may include a control circuit and a clock multiplexer circuit. The control circuit of the first clock MUX unit 112 may include an arbiter circuit, a multiplexer converter circuit, and an adapter circuit. Other MUX units described herein may include a similar configuration to the first clock MUX unit 112.

When the clock acknowledgement signal ACK is transmitted from the first PLL controller 111, the clock acknowledgement signal ACK may be transmitted to the first clock gating unit 114, the clock gating circuit may be deactivated according to a control of a control circuit included in the first clock gating unit 114, and the first clock CLK1 may be provided to the first IP block 171.

When the first IP block 171 does not need the first clock CLK1, the first IP block 171 may deactivate the clock request signal REQ. Thus, the clock request signal REQ transmitted to the first clock gating unit 114 may be deactivated and clock gating may be performed according to a control of the control circuit included in the first clock gating unit 114.

Since an operation of the second IP block 172 is dependent on an operation of the first IP block 171, the second IP block 172 cannot generate a clock request signal, and when the clock request signal REQ is activated in the first IP block 171, the second clock CLK2 may be provided to the second IP block 172 from the second clock gating unit 124.

The second PLL controller 121, the second clock MUX unit 122, the second clock dividing unit 123, the second clock gating unit 124, and the first channel management unit 115 may communicate with one another according to a full handshake method, and the clock request signal REQ can be transmitted from the first channel management unit 115 to the second PLL controller 121 at a time.

When the clock acknowledgement signal ACK is transmitted from the second PLL controller 121, the clock acknowledgement signal ACK may be transmitted to the second clock gating unit 124, the clock gating circuit may be deactivated according to a control of a control circuit included in the second clock gating unit 124, and the second clock CLK2 may be provided to the second IP block 172.

Referring to FIG. 6, according to an exemplary embodiment, the clock gating unit 114 (also referred to as a clock generating circuit), which includes a control circuit and a clock gating circuit, communicates with the channel management unit 115 (also referred to as a channel management circuit) according to a full handshake method and outputs a first clock to the IP block 171. Further, the clock gating unit 124 (also referred to as a clock generating circuit), which includes a control circuit and a clock gating circuit, communicates with the channel management circuit 115 according to a full handshake method and outputs a second clock different from the first clock to the IP block 172.

Figure 7:
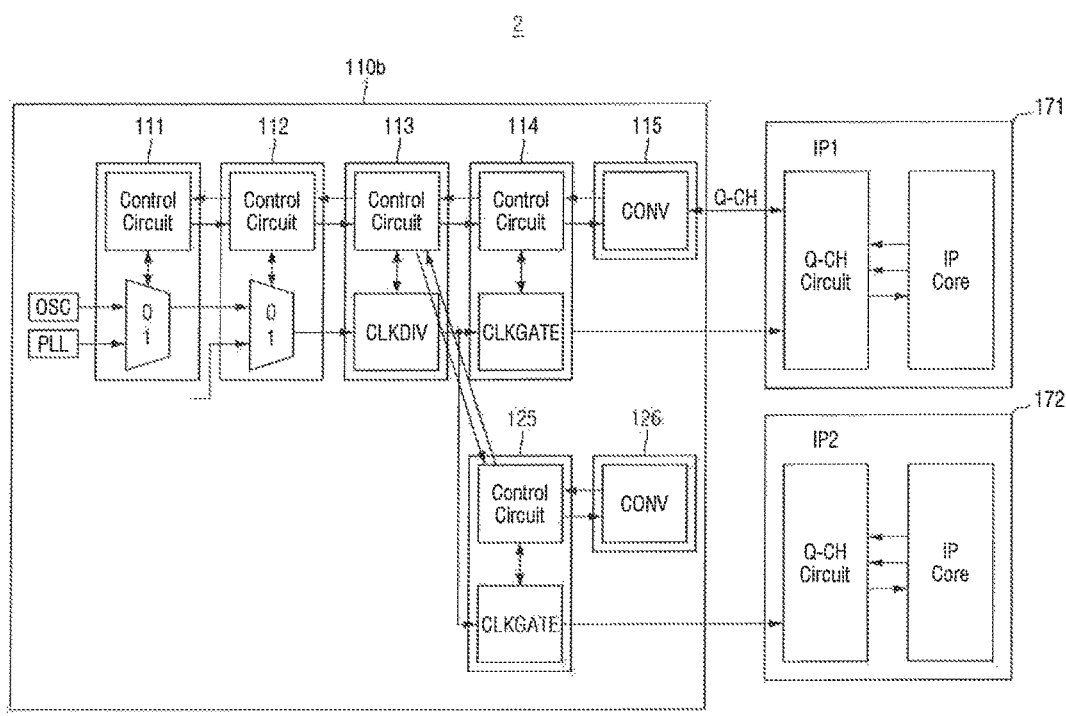
FIG. 7 is a block diagram illustrating a semiconductor device according to exemplary embodiments of the present disclosure.

FIG. 7 is a block diagram illustrating a semiconductor device according to exemplary embodiments of the present disclosure.

Referring to FIG. 7, a clock management unit 110b in a semiconductor device 2 according to exemplary embodiments of the present disclosure may include the first PLL controller 111, the first clock MUX unit 112, the first clock dividing unit 113, the first clock gating unit 114, the first channel management unit 115, a third clock gating unit 125, and a second channel management unit 126. According to exemplary embodiments, some of these components may be omitted or duplicated in the clock management unit 110b.

FIG. 7 illustrates an exemplary embodiment in which the second channel management unit 126 is used as a dummy unit. For example, instead of controlling the clock request signal REQ by a communication with the second IP block 172, the second channel management unit 126 may control the clock request signal REQ according to a control of software stored in a separate special function register (SFR).

The software stored in the SFR may determine whether the second IP block 172 needs a clock, and may control the clock request signal REQ according to a control of separate software.

The first channel management unit 115 may communicate with the first clock gating unit 114 according to a full handshake method, and the second channel management unit 126 may communicate with the third clock gating unit 125 according to a full handshake method.

For example, when the clock request signal REQ is transmitted to the first channel management unit 115 by the first IP block 171, the first channel management unit 115 may transmit the clock request signal REQ to the first clock gating unit 114. However, as described above, the second IP block 172 does not directly communicate with the second channel management unit 126.

The first PLL controller 111, the first clock MUX unit 112, the first clock dividing unit 113, the first clock gating unit 114, and the first channel management unit 115 may communicate with one another according to a full handshake method, and the clock request signal REQ can be transmitted from the first channel management unit 115 to the first PLL controller 111 at a time.

When the clock acknowledgement signal ACK is transmitted from the first PLL controller 111, the clock acknowledgement signal ACK may be transmitted to the first clock gating unit 114, the clock gating circuit included in the first clock gating unit 114 may be deactivated according to a control of the control circuit included in the first clock gating unit 114, and the first clock CLK1 may be provided to the first IP block 171.

Further, the first PLL controller 111, the first clock MUX unit 112, the first clock dividing unit 113, the third clock gating unit 125, and the second channel management unit 126 may communicate with one another according to a full handshake method, and the clock request signal REQ can be transmitted from the second channel management unit 126 to the first PLL controller 111 at a time. The first clock dividing unit 113 may include a control circuit and a clock dividing circuit. The control circuit included in the first clock dividing unit 113 may include an arbiter circuit and an adapter circuit.

When the clock acknowledgement signal ACK is transmitted from the first PLL controller 111, the clock acknowledgement signal ACK may be transmitted to the third clock gating unit 125, the clock gating circuit included in the third clock gating unit 125 may be deactivated according to a control of a control circuit included in the third clock gating unit 125, and the second clock CLK2 may be provided to the second IP block 172.

When the first IP block 171 does not need the first clock CLK1, the first IP block 171 may deactivate the clock request signal REQ. Thus, the clock request signal REQ transmitted to the first clock gating unit 114 may be deactivated and clock gating may be performed according to a control of the control circuit included in the first clock gating unit 114.

When the second IP block 172 does not need the second clock CLK2, the clock request signal REQ may be deactivated according to a control of the software included in the SFR, and clock gating may be performed according to the control of the control circuit included in the third clock gating unit 125.

Figure 8:
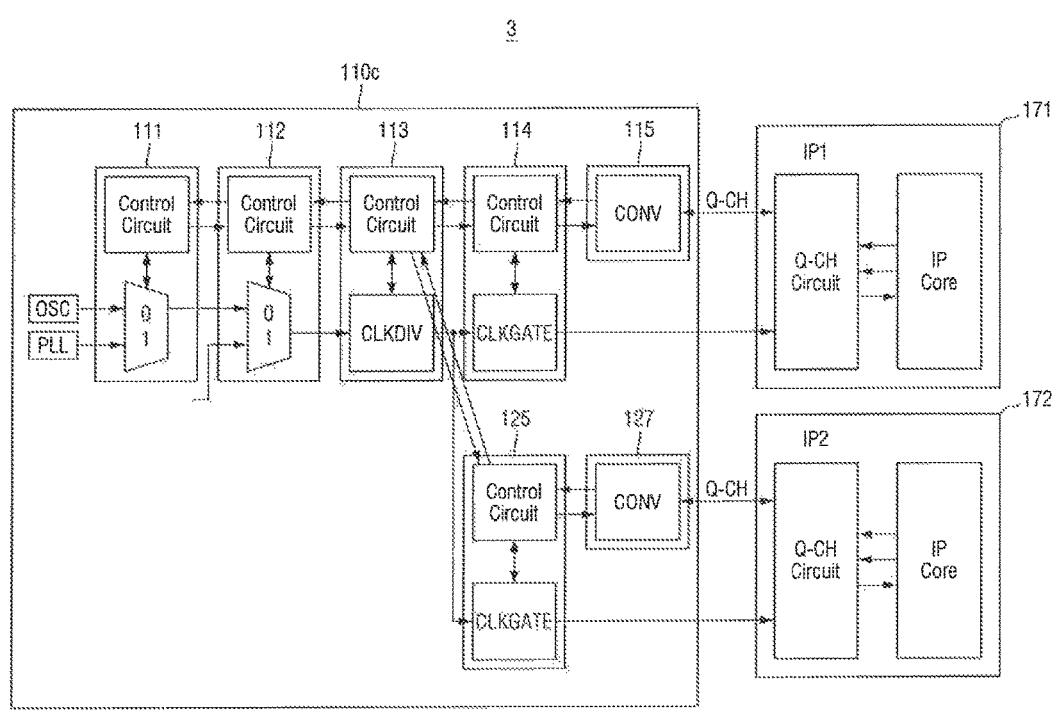
FIG. 8 is a block diagram illustrating a semiconductor device according to exemplary embodiments of the present disclosure.

FIG. 8 is a block diagram illustrating a semiconductor device according to exemplary embodiments of the present disclosure.

Referring to FIG. 8, a clock management unit 110c in a semiconductor device 3 according to exemplary embodiments of the present disclosure may include the first PLL controller 111, the first clock MUX unit 112, the first clock dividing unit 113, the first clock gating unit 114, the first channel management unit 115, the third clock gating unit 125, and a third channel management unit 127. According to exemplary embodiments, some of these components may be omitted or duplicated in the clock management unit 110c.

FIG. 8 illustrates an exemplary embodiment in which an operation of the first IP block 171 and an operation of the second IP block 172 are independent of each other. For example, the first IP block 171 operates regardless of whether the second IP block 172 operates and vice versa, and the first IP block 171 and the second IP block 172 may perform clock requesting independently of each other.

The first channel management unit 115 may communicate with the first clock gating unit 114 according to a full handshake method, and the third channel management unit 127 may communicate with the third clock gating unit 125 according to a full handshake method.

For example, when the first IP block 171 transmits the clock request signal REQ to the first channel management unit 115, the first channel management unit 115 transmits the clock request signal REQ to the first clock gating unit 114. Further, the second IP block 172 may independently transmit the clock request signal REQ to the third channel management unit 127, and the third channel management unit 127 may transmit the clock request signal REQ to the third clock gating unit 125.

The first PLL controller 111, the first clock MUX unit 112, the first clock dividing unit 113, the first clock gating unit 114, and the first channel management unit 115 may communicate with one another according to a full handshake method, and the clock request signal REQ can be transmitted from the first channel management unit 115 to the first PLL controller 111 at a time.

When the clock acknowledgement signal ACK is transmitted from the first PLL controller 111, the clock acknowledgement signal ACK may be transmitted to the first clock gating unit 114, the clock gating circuit may be deactivated according to a control of the control circuit included in the first clock gating unit 114, and the first clock signal CLK1 may be provided to the first IP block 171.

Further, the first PLL controller 111, the first clock MUX unit 112, the first clock dividing unit 113, the third clock gating unit 125, and the third channel management unit 127 may communicate with one another according to a full handshake method, and the clock request signal REQ can be transmitted from the third channel management unit 127 to the first PLL controller 111 at a time.

When the clock acknowledgement signal ACK is transmitted from the first PLL controller 111, the clock acknowledgement signal ACK may be transmitted to the third clock gating unit 125, the clock gating circuit included in the third clock gating unit 125 may be deactivated according to a control of the control circuit included in the third clock gating unit 125, and the second clock CLK2 may be provided to the second IP block 172.

When the first IP block 171 does not need the first clock CLK1, the first IP block 171 may deactivate the clock request signal REQ. Thus, the clock request signal REQ transmitted to the first clock gating unit 114 may be deactivated and clock gating may be performed according to a control of the control circuit included in the first clock gating unit 114.

When the second IP block 172 does not need the second clock CLK2, the second IP block 172 may deactivate the clock request signal REQ. Thus, the clock request signal REQ transmitted to the third clock gating unit 125 may be deactivated and clock gating may be performed according to a control of the control circuit included in the third clock gating unit 125.

Referring to FIG. 8, according to an exemplary embodiment, the clock gating unit 114 (also referred to as a clock generating circuit), which includes a control circuit and a clock gating circuit, communicates with the channel management unit 115 (also referred to as a channel management circuit) according to a full handshake method. Further, the clock gating unit 125 (also referred to as a clock generating circuit), which includes a control circuit and a clock gating circuit, communicates with the channel management unit 127 (also referred to as a channel management circuit) according to a full handshake method. The clock gating circuit 114 outputs a first clock to the IP block 171, and the clock gating circuit 125 outputs a second clock different from the first clock to the IP block 172.

Figure 9A:
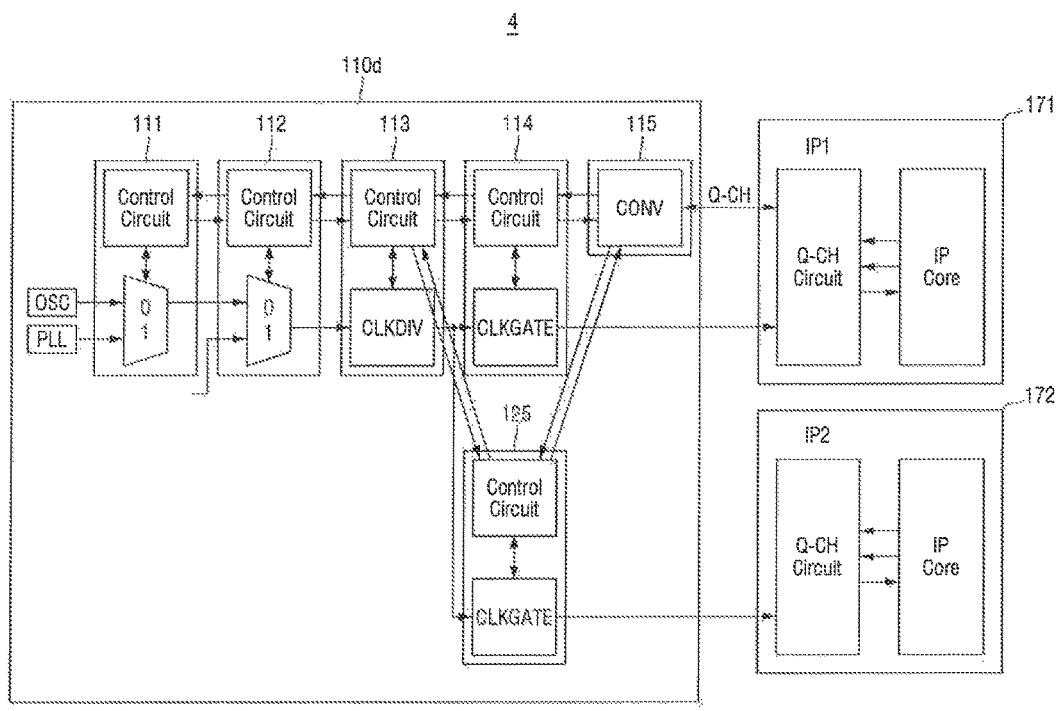
FIG. 9A is a block diagram illustrating a semiconductor device according to exemplary embodiments of the present disclosure.
Figure 9B:
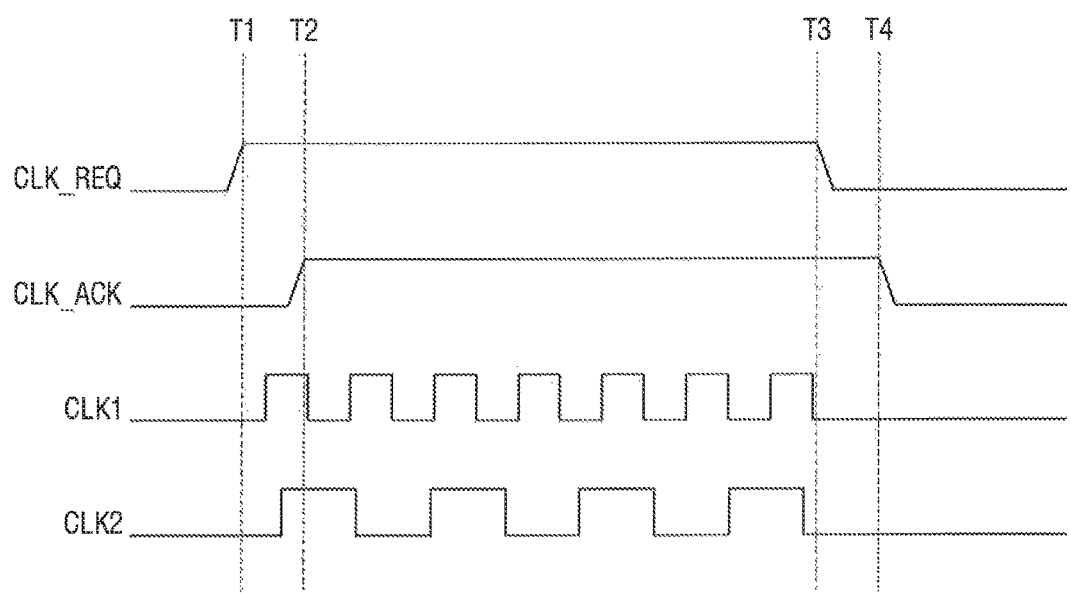
FIG. 9B is a timing diagram illustrating an operation of the semiconductor device of FIG. 9A according to exemplary embodiments of the present disclosure.

FIG. 9A is a block diagram illustrating a semiconductor device according to exemplary embodiments of the present disclosure. FIG. 9B is a timing diagram illustrating an operation of the semiconductor device of FIG. 9A according to exemplary embodiments of the present disclosure.

Referring to FIGS. 9A and 9B, a clock management unit 110d in a semiconductor device 4 according to exemplary embodiments of the present disclosure may include the first PLL controller 111, the first clock MUX unit 112, the first clock dividing unit 113, the first clock gating unit 114, the first channel management unit 115, and the third clock gating unit 125. According to exemplary embodiments, some of these components may be omitted or duplicated in the clock management unit 110d.

FIGS. 9A and 9B illustrate an exemplary embodiment in which a channel management unit and clock gating units, which are its parents, are connected to one another in a 1:n relationship. For example, FIGS. 9A and 9B illustrate an exemplary embodiment in which a plurality of clock gating units share one channel management unit among them during operation.

According to this configuration, an operation of the second IP block 172 is dependent on an operation of the first IP block 171, and the second block 172 operates whenever the first IP block 171 operates. Thus, according to exemplary embodiments, the second IP block 172 has the possibility to operate when the first IP block 171 operates.

The first channel management unit 115 may communicate with the first clock gating unit 114 and/or the third clock gating unit 125 according to a full handshake method. For example, when the first IP block 171 transmits a clock request signal REQ to the first channel management unit 115, the first channel management unit 115 may transmit the clock request signal REQ to the first clock gating unit 114.

The first PLL controller 111, the first clock MUX unit 112, the first clock dividing unit 113, the first clock gating unit 114, and the first channel management unit 115 may communicate with one another according to a full handshake method, and the clock request signal REQ can be transmitted from the first channel management unit 115 to the first PLL controller 111 at a time.

When the clock acknowledgement signal ACK is transmitted from the first PLL controller 111, the clock acknowledgement signal ACK may be transmitted to the first clock gating unit 114, the clock gating circuit may be deactivated according to a control of the control circuit included in the first clock gating unit 114, and the first clock CLK1 may be provided to the first IP block 171.

Since an operation of the second IP block 172 is dependent on an operation of the first IP block 171, the second IP block 172 cannot generate a clock request signal, and when the clock request signal REQ is activated in the first IP block 171, the second clock CLK2 may be provided to the second IP block 172 from the second clock gating unit 124.

The first PLL controller 111, the first clock MUX unit 112, the first clock dividing unit 113, the third clock gating unit 125, and the first channel management unit 115 may communicate with one another according to a full handshake method, and the clock request signal REQ can be transmitted from the first channel management unit 115 to the first PLL controller 111 at a time.

When the clock acknowledgement signal ACK is transmitted from the first PLL controller 111, the clock acknowledgement signal ACK may be transmitted to the third clock gating unit 125, the clock gating circuit included in the third clock gating unit 125 may be deactivated according to a control of the control circuit included in the third clock gating unit 125, and the second clock CLK2 may be provided to the second IP block 172.

When the first IP block 171 does not need the first clock CLK1, the first IP block 171 may deactivate the clock request signal REQ. Thus, the clock request signal REQ transmitted to the first clock gating unit 114 may be deactivated and clock gating may be performed according to a control of the control circuit included in the first clock gating unit 114. In this case, the clock request signal REQ transmitted to the third clock gating unit 125 may also be deactivated and clock gating may be performed according to a control of the control circuit included in the third clock gating unit 125.

Figure 10A:
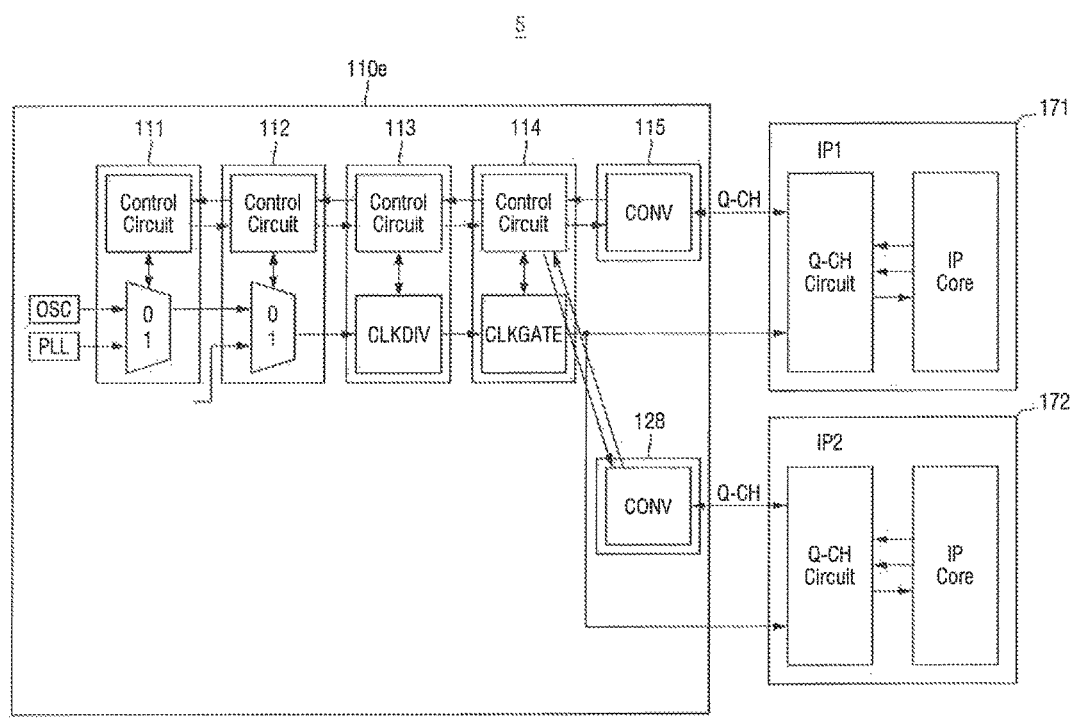
FIG. 10A is a block diagram illustrating a semiconductor device according to exemplary embodiments of the present disclosure.
Figure 10B:
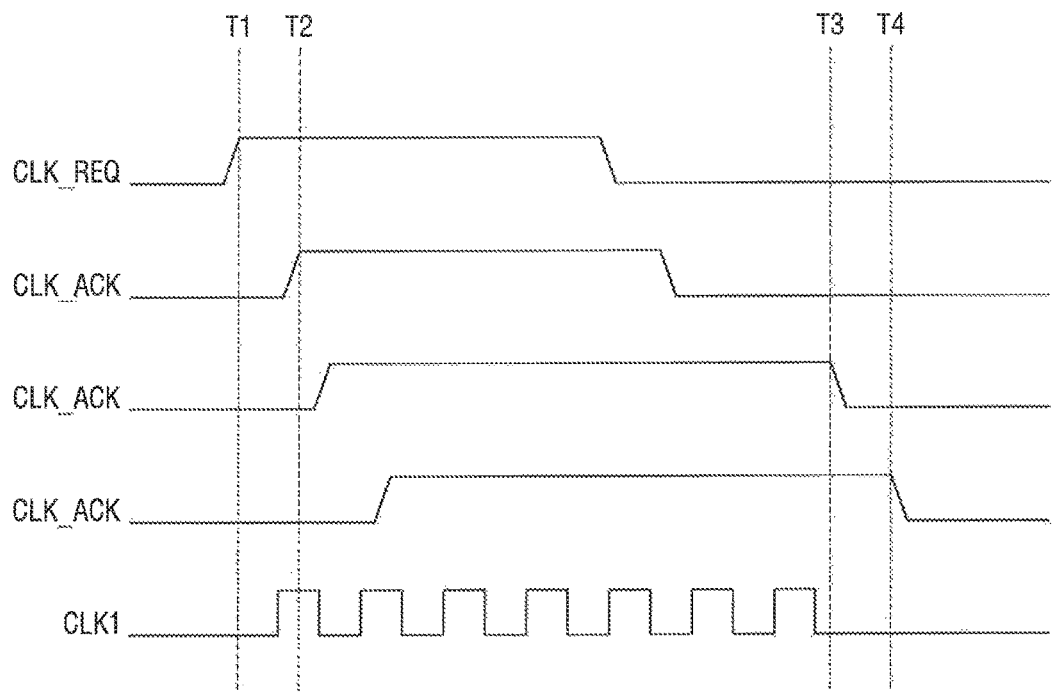
FIG. 10B is a timing diagram illustrating an operation of the semiconductor device of FIG. 10A according to exemplary embodiments of the present disclosure.

FIG. 10A is a block diagram illustrating a semiconductor device according to exemplary embodiments of the present disclosure. FIG. 10B is a timing diagram illustrating an operation of the semiconductor device of FIG. 10A according to exemplary embodiments of the present disclosure.

Referring to FIGS. 10A and 10B, a clock management unit 110e in a semiconductor device 5 according to exemplary embodiments of the present disclosure may include the first PLL controller 111, the first clock MUX unit 112, the first clock dividing unit 113, the first clock gating unit 114, the first channel management unit 115, and a fourth channel management unit 128. According to exemplary embodiments, some of these components may be omitted or duplicated in the clock management unit 110e.

FIGS. 10A and 10B illustrate an exemplary embodiment in which channel management units and a clock gating unit, which is its parent, are connected to one another in an n:1 relationship. For example, FIGS. 10A and 10B illustrate an exemplary embodiment in which a plurality of channel management units are connected to one clock gating unit.

According to this configuration, a plurality of IP blocks may use one clock among them (e.g., a plurality of IP blocks may share one clock). For example, the plurality of IP blocks may use the same clock, and when there are clock requests from the plurality of IP blocks, a control circuit included in the clock gating unit may perform an OR operation so as to determine whether a clock is needed.

The first channel management unit 115 may communicate with the first clock gating unit 114 according to a full handshake method, and the fourth channel management unit 128 may communicate with the first clock gating unit 114 according to a full handshake method. For example, when the first IP block 171 transmits the clock request signal REQ to the first channel management unit 115, or when the second IP block 172 transmits the clock request signal REQ to the fourth channel management unit 128, the first clock gating unit 114 may perform an OR operation.

The first PLL controller 111, the first clock MUX unit 112, the first clock dividing unit 113, the first clock gating unit 114, and the first channel management unit 115 may communicate with one another according to a full handshake method, and the clock request signal REQ can be transmitted from the first channel management unit 115 to the first PLL controller 111 at a time.

When the clock acknowledgement signal ACK is transmitted from the first PLL controller 111, the clock acknowledgement signal ACK may be transmitted to the first clock gating unit 114, the clock gating circuit may be deactivated according to a control of the control circuit included in the first clock gating unit 114, and the first clock CLK1 may be provided to the first IP block 171.

When the first IP block 171 does not need the first clock CLK1, the first IP block 171 may deactivate the clock request signal REQ. As a result, the clock request signal REQ transmitted to the first clock gating unit 114 may be deactivated. In this case, the control circuit included in the first clock gating unit 114 may perform an AND operation so as to determine whether to perform clock gating.

The first PLL controller 111, the first clock MUX unit 112, the first clock dividing unit 113, the first clock gating unit 114, and the fourth channel management unit 128 may communicate with one another according to a full handshake method, and the clock request signal REQ can be transmitted from the fourth channel management unit 128 to the first PLL controller 111 at a time.

When the clock acknowledgement signal ACK is transmitted from the first PLL controller 111, the clock acknowledgement signal ACK may be transmitted to the first clock gating unit 114, the clock gating circuit may be deactivated according to a control of the control circuit included in the first clock gating unit 114, and the first clock CLK1 may be provided to the second IP block 172. That is, the clock provided to the first IP block 171 and the clock provided to the second IP block 172 may be the same.

According to an exemplary embodiment, referring to FIG. 10A, the clock gating unit 114 (also referred to as a clock generating circuit), which includes a control circuit and a clock gating circuit, communicates with the channel management unit 115 (also referred to as a channel management circuit) according to a full handshake method. Further, the channel management unit 128 (also referred to as a channel management circuit) communicates with the clock generating circuit 114 according to a full handshake method. The channel management circuit 115 transmits a first clock request signal to the clock generating circuit 114, and the channel management circuit 128 transmits a second clock request signal to the clock generating circuit 114. The clock generating circuit 114 outputs a clock when at least one of the first clock request signal or the second clock request signal is activated.

Figure 11:
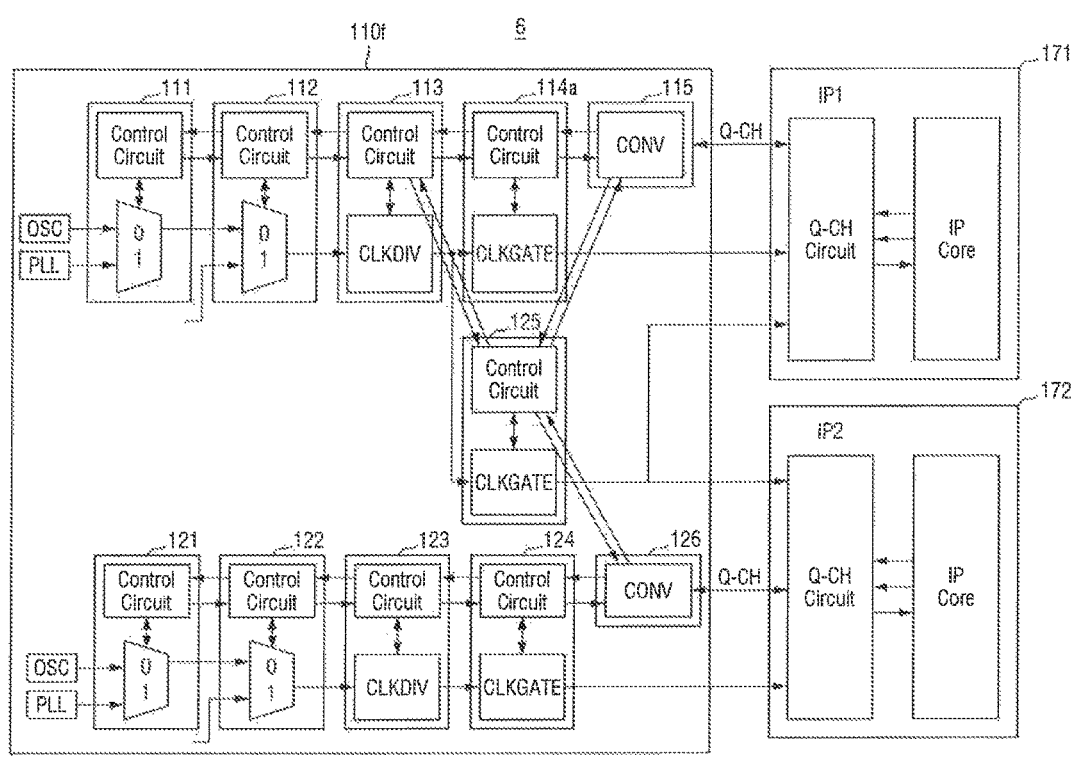
FIG. 11 is a block diagram illustrating a semiconductor device according to exemplary embodiments of the present disclosure.

FIG. 11 is a block diagram illustrating a semiconductor device according to exemplary embodiments of the present disclosure.

Referring to FIG. 11, a clock management unit 110*f* in a semiconductor device 6 according to exemplary embodiments of the present disclosure may include the first controller 111, the first clock MUX unit 112, the first clock dividing unit 113, a first clock gating unit 114*a*, the first channel management unit 115, the third clock gating unit 125, the second PLL controller 121, the second clock MUX unit 122, the second clock dividing unit 123, the second clock gating unit 124, and the second channel management unit 126. According to exemplary embodiments, some of these components may be omitted or duplicated in the clock management unit 110*f*.

FIG. 11 illustrates an exemplary embodiment in which channel management units and clock gating units, which are their parents, are connected to one another in an win relationship. That is, FIG. 11 illustrates an exemplary embodiment in which the 1:n relationship and the n:1 relationship, which are described above, are both applied.

An operation of the clock management unit 110*f* in the semiconductor device 6 according to exemplary embodiments of the present disclosure may be substantially the same as those described above.

Figure 12:
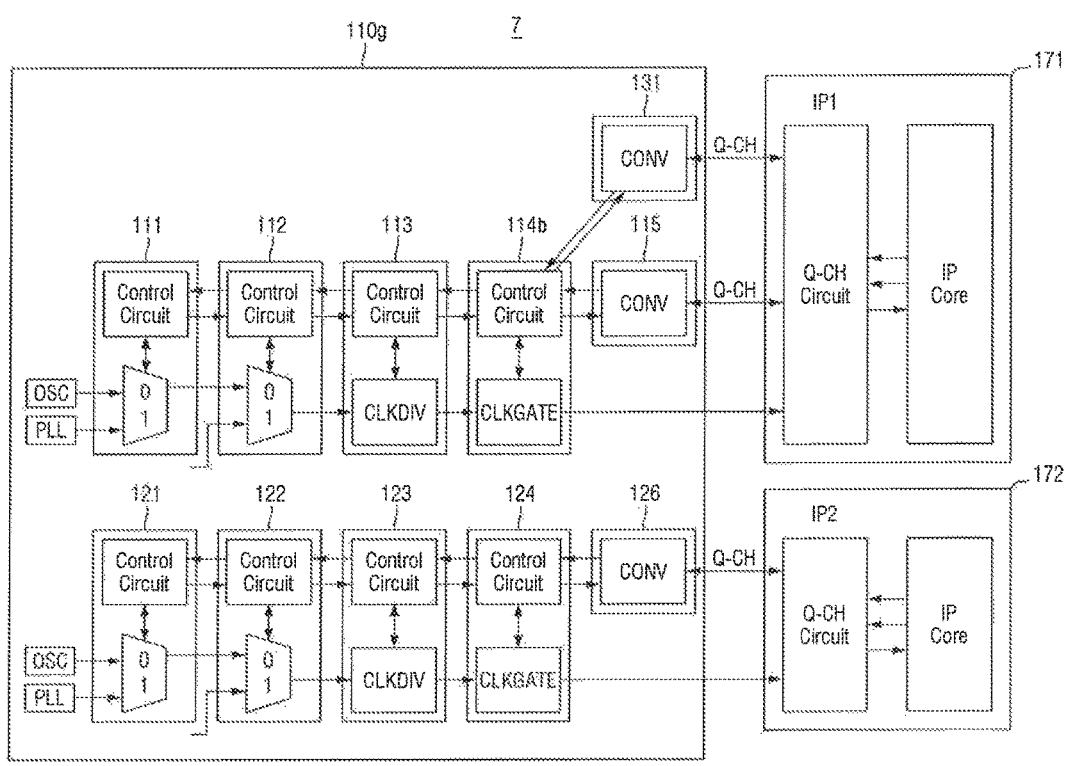
FIG. 12 is a block diagram illustrating a semiconductor device according to exemplary embodiments of the present disclosure.

FIG. 12 is a block diagram illustrating a semiconductor device according to exemplary embodiments of the present disclosure.

Referring to FIG. 12, a clock management unit 110*g* in a semiconductor device 7 according to exemplary embodiments of the present disclosure may include the first PLL controller 111, the first clock MUX unit 112, the first clock dividing unit 113, a first clock gating unit 114*b*, the first channel management unit 115, the second PLL controller 121, the second clock MUX unit 122, the second clock dividing unit 123, the second clock gating unit 124, the second channel management unit 126, and a fifth channel management unit 131. According to exemplary embodiments, some of these components may be omitted or duplicated in the clock management unit 110*g*.

FIG. 12 illustrates an exemplary embodiment in which channel management units and clock gating units, which are their parents, are connected to one another in an n:m relationship. That is, FIG. 12 illustrates an exemplary embodiment in which the 1:n relationship and the n:1 relationship, which are described above, are both applied.

An operation of the clock management unit 110*g* in the semiconductor device 7 according to exemplary embodiments of the present disclosure may be substantially the same as those described above.

Figure 13:
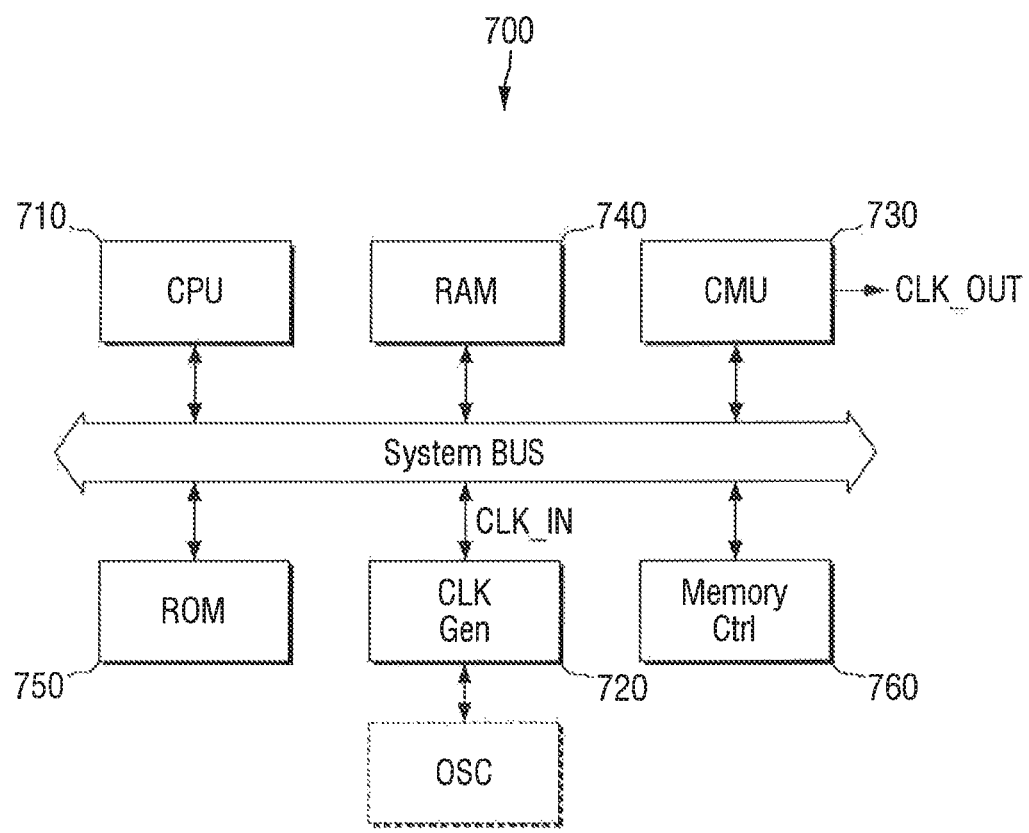
FIG. 13 is a block diagram illustrating a semiconductor device according to exemplary embodiments of the present disclosure.

FIG. 13 is a block diagram illustrating a semiconductor device according to exemplary embodiments of the present disclosure.

Referring to FIG. 13, a semiconductor device 700 may include a central processing unit 710, a clock generator 720, a clock management unit 730, a RAM 740, a ROM 750, and a memory control unit 760 connected to one another through a system bus. The oscillator OSC may be disposed outside the semiconductor device 700 so as to provide an oscillation signal to the semiconductor device 700. It is to be understood that the semiconductor device 700 illustrated in FIG. 13 is merely exemplary, and that the present disclosure is not limited thereto. For example, in exemplary embodiments, the semiconductor device 700 may include various other functional blocks, and the oscillator OSC may be provided within the semiconductor device 700. The semiconductor device 700 shown in FIG. 13 may be provided as an application processor in a semiconductor system.

The clock generator 720 may generate a reference clock signal CLK_IN having a reference frequency by using a signal from the oscillator OSC. The clock management unit 730 may receive the reference clock signal CLK_IN, generate an operating clock signal CLK_OUT having a predetermined frequency, and provide the generated operating clock signal CLK_OUT to each of the functional blocks. The clock management unit 730 may include one or more master clock controller and slave clock controller, and each of the clock controllers may generate the operating clock signal CLK_OUT by using the reference clock signal CLK_IN.

Further, the clock controllers in the clock management unit 730 may be connected through a channel so as to manage clock signals in terms of hardware. Further, the clock controllers in the clock management unit 730 may be connected to the functional blocks through a channel so as to perform clock requesting and acknowledging to the request in terms of hardware.

The central processing unit 710 may process or execute code and/or data stored in the RAM 740. For example, the central processing unit 710 may process or execute the code and/or data in response to an operating clock output from the clock management unit 730. The central processing unit 710 may be implemented as a multi-core processor. The multi-core processor may be one computing component having two or more independent substantial processors, and each of the processors may read and execute program instructions. The multi-core processor may drive a plurality of accelerators at substantially the same time. Thus, a data processing system including the multi-core processor may perform multi-acceleration.

The RAM 740 may temporarily store, for example, program code, data, or instructions therein. For example, program code and/or data stored in an internal or external memory may be temporarily stored in the RAM 740 according to a control of the central processing unit 710 or a booting code stored in the ROM 750. The memory control unit 760 may be a block for interfacing with the internal or external memory, and the memory control unit 760 may control overall operation of the memory, and also control general data exchange between a host and the memory.

Figure 14:
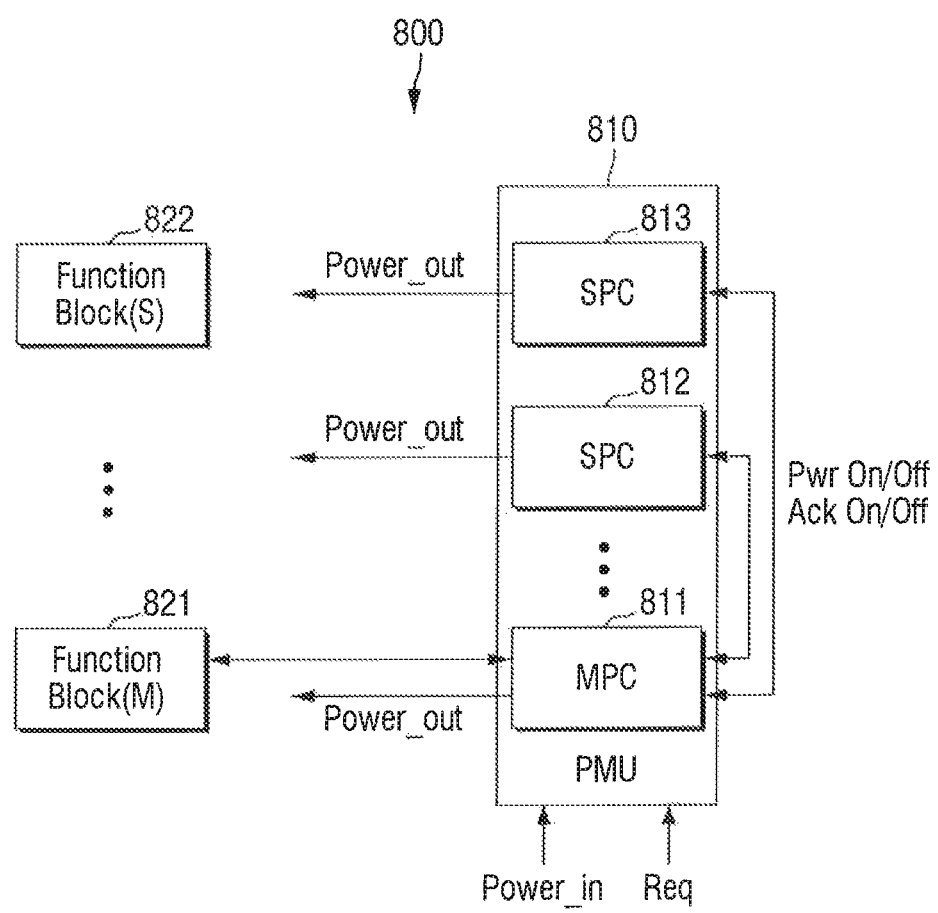
FIG. 14 is a block diagram illustrating a semiconductor device according to exemplary embodiments of the present disclosure.

FIG. 14 is a block diagram illustrating a semiconductor device according to exemplary embodiments of the present disclosure.

FIG. 14 illustrates an exemplary embodiment in which a semiconductor device 800 includes a power management unit 810 for managing power supplied to functional blocks. The power management unit 810 may be designed to manage power used inside the semiconductor device 800.

The semiconductor device 800 may include the power management unit 810 and a plurality of functional blocks 821 and 822. The functional blocks 821 and 822 may be classified as a master functional block 821 and a slave functional block 822. To operate the master functional block 821, power is supplied to the master functional block 821. In addition, power is supplied to one or more slave functional blocks 822 associated with the operation of the master functional block 821.

A master power controller 811 may communicate with each of slave power controllers 812 and 813 through a channel. The power management unit 810 may receive input power Power_in, and control the power so as to convert the power to be suitable for each of the functional blocks, and may generate output power Power_out. Further, the power management unit 810 may provide power or cut off power supplied to the master functional block 821 and the slave functional block 822 according to a power request Req.

The master power controller 811 may receive the power request Req in terms of software on the basis of code processing of the central processing unit, or receive the power request Req in terms of hardware from the master functional block 821. Further, the master functional block 821 may provide power on/off instruction Pwr On/Off to the slave power controllers 812 and 813, and receive power acknowledgement Ack On/Off from the slave power controllers 812 and 813.

Figure 15:
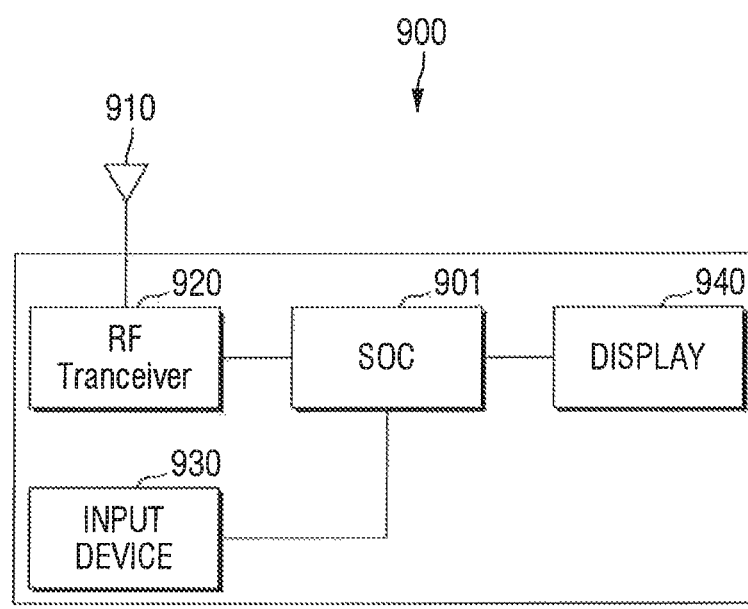
FIG. 15 is a block diagram illustrating an embodiment of a semiconductor system including a semiconductor device according to exemplary embodiments of the present disclosure.

FIG. 15 is a block diagram illustrating an embodiment of a semiconductor system including a semiconductor device according to exemplary embodiments of the present disclosure.

Referring to FIG. 15, according to exemplary embodiments, a semiconductor system 900 may include a system-on-chip (SoC) 901, an antenna 910, a radio frequency transceiver 920, an input device 930, and a display 940. The radio frequency transceiver 920 may transmit or receive radio frequency signals through the antenna 910. For example, the radio frequency transceiver 920 may convert the radio frequency signals received through the antenna 910 into signals which can be processed by the SoC 901.

Therefore, the SoC 901 may process the signal output from the radio frequency transceiver 920, and transmit the processed signal to the display 940. Further, the radio frequency transceiver 920 may convert the signal output from the SoC 901 into a radio frequency signal, and output the converted radio frequency signal to an external device through the antenna 910. The input device 930 may enable a control signal for controlling an operation of the SoC 901 or data to be processed by the SoC 901 to be input, and may be implemented as, for example, a pointing device such as a touch pad and a computer mouse, as well as a keypad, or a keyboard.

Figure 16:
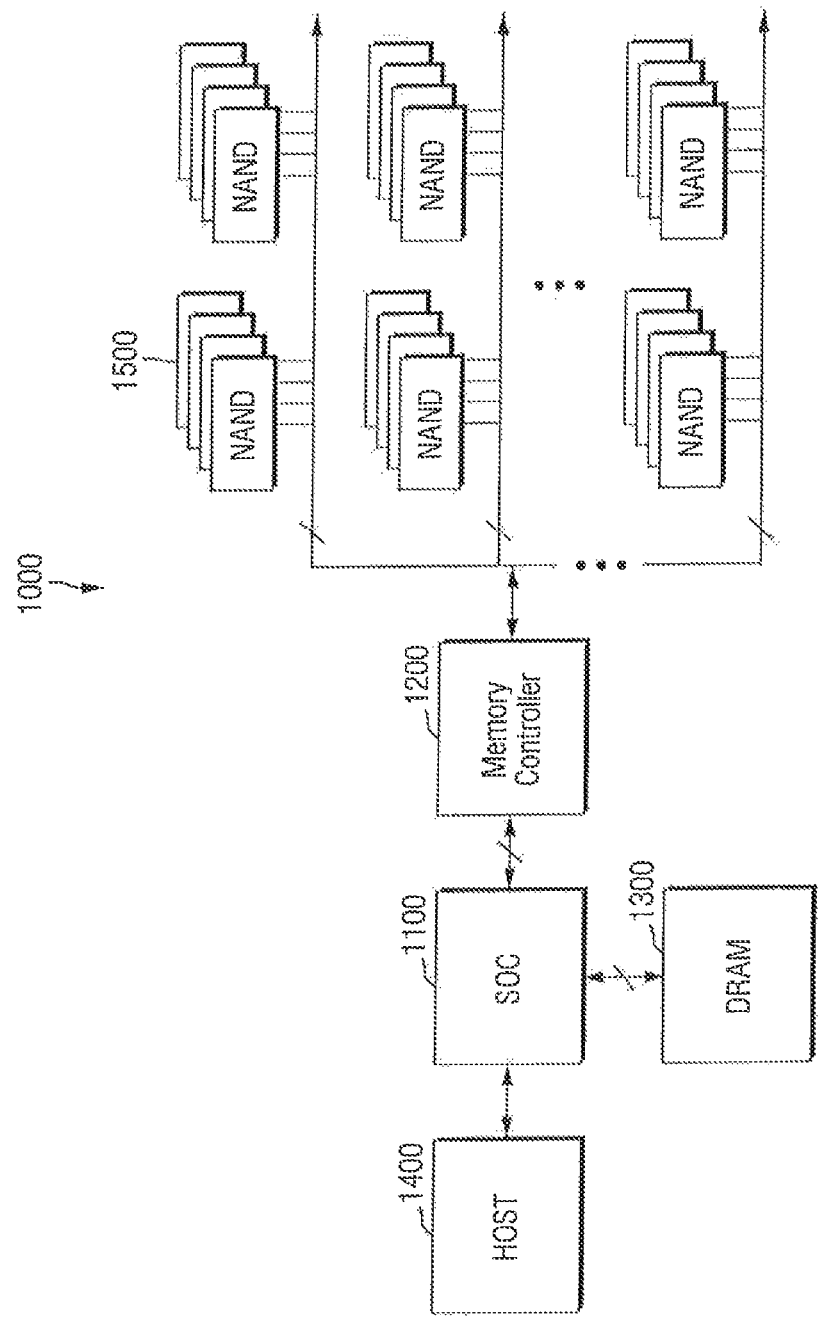
FIG. 16 is a block diagram illustrating an embodiment of a semiconductor system including a semiconductor device according to exemplary embodiments of the present disclosure.

FIG. 16 is a block diagram illustrating an embodiment of a semiconductor system including a semiconductor device according to exemplary embodiments of the present disclosure.

Referring to FIG. 16, a memory system 1000 may be implemented as a data processing device such as a solid state drive (SSD). The memory system 1000 may include a plurality of memory devices 1500, a memory controller 1200 capable of controlling a data processing operation of each of the plurality of memory devices 1500, a volatile memory device 1300 such as DRAM, and an SoC 1100 for controlling storage of data transmitted/received between the memory controller 1200 and a host 1400, into the volatile memory device 1300. The SoC 1100 may be implemented according to the exemplary embodiments described above.

Exemplary embodiments of the present disclosure provide a semiconductor device in which a connection relation between a channel management unit and an intellectual property (IP) block is defined in an SoC so as to enable various clock consumers to be applied to the semiconductor device.

While the present disclosure has been particularly illustrated and described with reference to the exemplary embodiments thereof it will be understood by those of ordinary skill in the art that various changes in form and detail may be made therein without departing from the spirit and scope of the present disclosure as defined by the following claims.

What is claimed is:

1. A semiconductor device, comprising:
a first clock generating circuit including a first control circuit and a first clock gating circuit;
a first channel management circuit which communicates with the first clock generating circuit according to a full handshake method;
a second clock generating circuit including a second control circuit and a second clock gating circuit; and
a second channel management circuit which communicates with the second clock generating circuit according to the full handshake method,
wherein the first clock gating circuit outputs a first clock, and the second clock gating circuit outputs a second clock different from the first clock,
wherein the first channel management circuit transmits a second clock request signal to the first clock generating circuit in response to a first clock request signal, and the first clock generating circuit transmits a first clock acknowledgement signal to the first channel management circuit in response to the second clock request signal,
wherein the second channel management circuit transmits a fourth clock request signal to the second clock generating circuit in response to a third clock request signal, and the second clock generating circuit transmits a second clock acknowledgement signal to the second channel management circuit in response to the fourth clock request signal.

2. The semiconductor device of claim 1, wherein the first control circuit deactivates the first clock gating circuit when the second clock request signal is activated, and the second control circuit deactivates the second clock gating circuit when the fourth clock request signal is activated.

3. The semiconductor device of claim 1, further comprising:
a first logic block which communicates with the first channel management circuit, and a second logic block which communicates with the second channel management circuit.

4. The semiconductor device of claim 3, wherein the first channel management circuit and the first logic block communicate using the full handshake method.

5. The semiconductor device of claim 3, wherein the first logic block is an intellectual property (IP) block, and the IP block activates the first clock request signal when the first clock is needed by the IP block.

6. The semiconductor device of claim 5, wherein the first clock generating circuit provides the first clock to the IP block in response to the first clock request signal.

7. The semiconductor device of claim 6, wherein the IP block deactivates the first clock request signal when the first clock is not needed by the IP block.

8. The semiconductor device of claim 1, wherein the first clock generating circuit and the first channel management circuit communicate using a single clock domain.

9. The semiconductor device of claim 8, wherein the first control circuit and the first clock gating circuit use different clock domains.

10. A semiconductor device, comprising:
a first clock generating circuit including a first control circuit and a first clock gating circuit;
a first channel management circuit which communicates with the first clock generating circuit according to a full handshake method; and
a second clock generating circuit including a second control circuit and a second clock gating circuit, wherein the second clock generating circuit communicates with the first channel management circuit according to the full handshake method, and the first clock gating circuit outputs a first clock, and the second clock gating circuit outputs a second clock different from the first clock, wherein the first channel management circuit transmits a first clock request signal to the first clock generating circuit, and a second clock request signal to the second clock generating circuit, wherein the first clock generating circuit transmits a first clock acknowledgement signal to the first channel management circuit in response to the first clock request signal, wherein the second clock generating circuit transmits a second clock acknowledgement signal to the first channel management circuit in response to the second clock request signal.

11. The semiconductor device of claim 10, wherein the first control circuit deactivates the first clock gating circuit when the first clock request signal is activated, and the second control circuit deactivates the second clock gating circuit when the second clock request signal is activated.

12. A semiconductor device, comprising:
a first clock generating circuit including a first control circuit and a first clock gating circuit;
a first channel management circuit which communicates with the first clock generating circuit according to a full handshake method; and
a second channel management circuit which communicates with the first clock generating circuit according to the full handshake method,
wherein the first channel management circuit transmits a first clock request signal to the first clock generating circuit, and the second channel management circuit transmits a second clock request signal to the first clock generating circuit,
wherein the first clock generating circuit transmits a first clock acknowledgment signal to the first channel management circuit in response to the first clock request signal, and transmits a second clock acknowledgment signal to the second channel management circuit in response to the second clock request signal.

13. The semiconductor device of claim 12, wherein the first clock generating circuit outputs a first clock when at least one of the first clock request signal or the second clock request signal is activated.

14. The semiconductor device of claim 13, further comprising:
a first logic block which communicates with the first channel management circuit using the full handshake method; and
a second logic block which communicates with the second channel management circuit using the full handshake method.

15. The semiconductor device of claim 14, wherein the first clock generating circuit provides the first clock to at least one of the first logic block or the second logic block.

* * * * *